(12) United States Patent
Uriu et al.

(10) Patent No.: US 12,496,818 B2
(45) Date of Patent: Dec. 16, 2025

(54) METHOD FOR MANUFACTURING MULTI-LAYER STACK

(71) Applicant: Panasonic Intellectual Property Management Co., Ltd., Osaka (JP)

(72) Inventors: Eiichi Uriu, Osaka (JP); Kenji Hasegawa, Osaka (JP); Tasuku Ishibashi, Ishikawa (JP); Hiroyuki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 800 days.

(21) Appl. No.: 17/772,950

(22) PCT Filed: Sep. 29, 2020

(86) PCT No.: PCT/JP2020/036963
§ 371 (c)(1),
(2) Date: Apr. 28, 2022

(87) PCT Pub. No.: WO2021/085013
PCT Pub. Date: May 6, 2021

(65) Prior Publication Data
US 2022/0371312 A1    Nov. 24, 2022

(30) Foreign Application Priority Data

Nov. 1, 2019  (JP) .................................. 2019-200258
May 29, 2020  (JP) .................................. 2020-094970

(51) Int. Cl.
*B32B 7/022*   (2019.01)
*B32B 3/00*    (2006.01)
(Continued)

(52) U.S. Cl.
CPC .......... *B32B 37/1018* (2013.01); *B32B 7/022* (2019.01); *B32B 7/12* (2013.01);
(Continued)

(58) Field of Classification Search
None
See application file for complete search history.

(56) References Cited

U.S. PATENT DOCUMENTS 5,891,536 A    4/1999  Collins et al.
6,054,195 A    4/2000  Collins et al.
(Continued)

FOREIGN PATENT DOCUMENTS

EP          3950627 A1      2/2022
JP       H10-507500 A       7/1998
(Continued)

OTHER PUBLICATIONS

English machine translation of JP 63276542 A; Minami; Nov. 14, 1988; 7 pages; B32B37/1018. (Year: 1988).*

(Continued)

*Primary Examiner* — Linda L Gray
(74) *Attorney, Agent, or Firm* — Rimon P.C.

(57) ABSTRACT

An object of the present disclosure is to provide a method for manufacturing a multi-layer stack with excellent mechanical strength and thermal insulation properties. A multi-layer stack includes a glass panel unit, an intermediate film, and a transparent plate attached via the intermediate film to the glass panel unit. The glass panel unit includes a first glass panel, a second glass panel, and an evacuated space interposed between the first glass panel and the second glass panel. The method includes assembling the glass panel unit and the transparent plate together via the intermediate film inside an evacuated chamber.

8 Claims, 21 Drawing Sheets

(51) Int. Cl.
  *B32B 7/12* (2006.01)
  *B32B 17/10* (2006.01)
  *B32B 37/10* (2006.01)
  *E06B 3/66* (2006.01)
  *E06B 3/663* (2006.01)
  *B32B 37/12* (2006.01)

(52) U.S. Cl.
  CPC .... *B32B 17/10036* (2013.01); *B32B 17/1044* (2013.01); *B32B 17/10871* (2013.01); *E06B 3/6612* (2013.01); *E06B 3/66304* (2013.01); *B32B 2037/1253* (2013.01); *B32B 2250/03* (2013.01); *B32B 2307/304* (2013.01); *B32B 2307/412* (2013.01); *B32B 2307/42* (2013.01); *B32B 2307/546* (2013.01); *B32B 2307/732* (2013.01)

(56) References Cited

U.S. PATENT DOCUMENTS

| | | |
|---|---|---|
| 6,071,575 A | 6/2000 | Collins et al. |
| 6,083,578 A | 7/2000 | Collins et al. |
| 2006/0154005 A1 | 7/2006 | Misonou et al. |
| 2010/0215966 A1 | 8/2010 | Ito et al. |
| 2011/0247754 A1 | 10/2011 | Canfield |
| 2013/0004735 A1 | 1/2013 | Ito et al. |
| 2014/0034218 A1 | 2/2014 | Hogan et al. |
| 2016/0096344 A1 | 4/2016 | Kurihara |
| 2016/0193818 A1 | 7/2016 | Hogan et al. |
| 2017/0361598 A1 | 12/2017 | Hogan et al. |
| 2019/0168496 A1 | 6/2019 | Hogan et al. |
| 2019/0195003 A1 | 6/2019 | Abe et al. |
| 2019/0270215 A1 | 9/2019 | Shimizu et al. |
| 2019/0329530 A1 | 10/2019 | Gier et al. |
| 2020/0361110 A1 | 11/2020 | Shimizu et al. |
| 2022/0152993 A1 | 5/2022 | Hasegawa et al. |

FOREIGN PATENT DOCUMENTS

| | | | |
|---|---|---|---|
| JP | 2002-321948 A | | 11/2002 |
| JP | 2004323317 A | * | 11/2004 |
| JP | 2013-047007 A | | 3/2013 |
| JP | 2015-529623 A | | 10/2015 |
| JP | 2018-532678 A | | 11/2018 |
| KR | 10-2018-0015205 A | | 2/2018 |
| WO | 96/12862 A1 | | 5/1996 |
| WO | 2004/016563 A1 | | 2/2004 |
| WO | 2005/000762 A1 | | 1/2005 |
| WO | 2012/157616 A1 | | 11/2012 |
| WO | 2014/022118 A1 | | 2/2014 |
| WO | 2015/019925 A1 | | 2/2015 |
| WO | 2018/043376 A1 | | 3/2018 |
| WO | 2018/088539 A1 | | 5/2018 |

OTHER PUBLICATIONS

European Extended Search Report dated Nov. 21, 2022 issued for the related European Patent Application No. 20881926.8.

International Search Report and Written Opinion issued in corresponding International Patent Application No. PCT/JP2020/036963, dated Dec. 1, 2020; with partial English translation.

International Search Report and Written Opinion issued in corresponding International Patent Application No. PCT/JP2020/013321, dated Jun. 23, 2020; with English translation.

Extended European Search Report dated Apr. 25, 2022 issued in the corresponding European Patent Application No. 20783156.1.

* cited by examiner

METHOD FOR MANUFACTURING MULTI-LAYER STACK

CROSS-REFERENCE OF RELATED APPLICATIONS

This application is the U.S. National Phase under 35 U.S.C. § 371 of International Patent Application No. PCT/JP2020/036963, filed on Sep. 29, 2020, which in turn claims the benefit of Japanese Application No. 2019-200258, filed on Nov. 1, 2019 and Japanese Application No. 2020-094970, filed on May 29, 2020, the entire disclosures of which Applications are incorporated by reference herein.

TECHNICAL FIELD

The present disclosure generally relates to a method for manufacturing a multi-layer stack. More particularly, the present disclosure relates to a method for manufacturing a multi-layer stack including a glass panel unit, a transparent plate, and an intermediate film.

BACKGROUND ART

A glass panel unit has been known in the art as a structure, of which the thermal insulation properties are improved by providing an evacuated space between two glass panels facing each other. For example, Patent Literature 1 discloses a vacuum-insulated glass window unit, in which a space is provided between two glass substrates.

There has been an increasing demand for glass panel units with further improved thermal insulation properties and mechanical strength.

CITATION LIST

Patent Literature

Patent Literature 1: JP 2015-529623 A

SUMMARY OF INVENTION

An object of the present disclosure is to provide a method for manufacturing a multi-layer stack with excellent thermal insulation properties and mechanical strength.

A method for manufacturing a multi-layer stack according to an aspect of the present disclosure has the following feature. The multi-layer stack includes a glass panel unit, an intermediate film, and a transparent plate. The transparent plate is attached via the intermediate film to the glass panel unit. The glass panel unit includes a first glass panel, a second glass panel, and an evacuated space. The evacuated space is interposed between the first glass panel and the second glass panel. The method includes assembling the glass panel unit and the transparent plate together via the intermediate film inside an evacuated chamber.

A method for manufacturing a multi-layer stack according to another aspect of the present disclosure has the following feature. The multi-layer stack includes a glass panel unit, an intermediate film, and a transparent plate. The transparent plate is attached via the intermediate film to the glass panel unit. The glass panel unit includes a first glass panel, a second glass panel, and an evacuated space. The evacuated space is interposed between the first glass panel and the second glass panel. The method includes: heating a multi-layer assembly, including the glass panel unit, the intermediate film, and the transparent plate attached via the intermediate film to the glass panel unit, inside an evacuated chamber to soften the intermediate film; and then keeping the inside of the chamber evacuated until the intermediate film is cooled and cured while leaving the multi-layer assembly loaded inside the chamber.

DESCRIPTION OF EMBODIMENTS

1. First Embodiment

1-1. Overview of First Embodiment

Figure 1A:
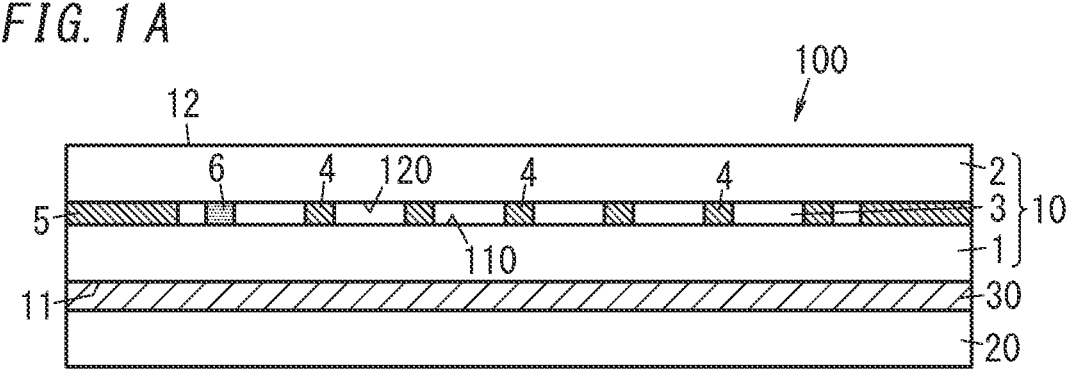
FIG. 1A is a schematic cross-sectional view illustrating an exemplary multi-layer stack according to a first embodiment.

As shown in FIG. 1A, a method for manufacturing a multi-layer stack 100 according to a first embodiment of the present disclosure is designed to manufacture a multi-layer stack 100. The multi-layer stack 100 includes a glass panel unit 10, an intermediate film 30, and a transparent plate 20. The transparent plate 20 is attached via the intermediate film 30 to the glass panel unit 10. The glass panel unit 10 includes a first glass panel 1, a second glass panel 2, and an evacuated space 3. The evacuated space 3 is interposed between the first glass panel 1 and the second glass panel 2. The method includes assembling the glass panel unit 10 and the transparent plate 20 together via the intermediate film 30 inside an evacuated chamber 8 (see FIG. 3).

According to this manufacturing method, a glass panel unit 10 and a transparent plate 20 are assembled together, thus improving the thermal insulation properties and mechanical strength of the multi-layer stack 100. In addition, while the glass panel unit 10 and the transparent plate 20 are being assembled together, the glass panel unit 10 is placed in an evacuated environment inside a chamber 8. This allows the glass panel unit 10 and the transparent plate 20 to be assembled together with flexure (warpage) of the glass panel unit 10 due to the atmospheric pressure reduced. This enables manufacturing a multi-layer stack 100 with reduced flexure.

1. Details of First Embodiment

In a method for manufacturing a multi-layer stack 100 according to the first embodiment, a transparent plate 20 is attached to an outer surface 11, 12 of at least one of a first glass panel 1 or a second glass panel 2 of a glass panel unit 10 with an intermediate film 30 interposed between the outer surface 11, 12 and the transparent plate 20 as shown in FIGS. 1A and 2A.

As used herein, the outer surface 11 of the first glass panel 1 is a surface, facing away from the second glass panel 2, of the first glass panel 1 and is one surface with the first glass panel 1 of the glass panel unit 10. Also, as used herein, the outer surface 12 of the second glass panel 2 is a surface, facing away from the first glass panel 1, of the second glass panel 2 and is the other surface with the second glass panel 2 of the glass panel unit 10.

The multi-layer stack 100 further includes a plurality of spacers 4. The plurality of spacers 4 are provided, in the evacuated space 3, between the first glass panel 1 and the second glass panel 2. A pressure applied when the glass panel unit 10 and the transparent plate 20 are assembled together is less than a compressive strength of the plurality of spacers 4. As used herein, the "compressive strength" is a value representing, by force per unit area, the maximum load that a given structure can withstand before the structure is broken under the pressure (compression force).

Figure 1B:
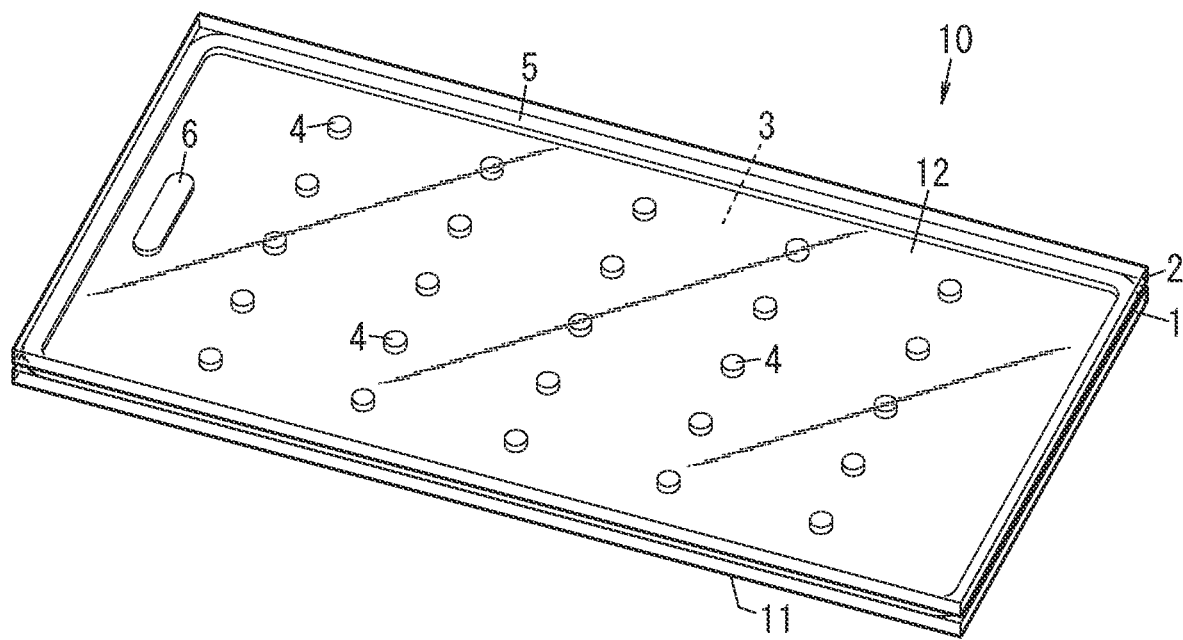
FIG. 1B is a schematic perspective view illustrating a glass panel unit included in the multi-layer stack shown in FIG. 1A.

In the multi-layer stack 100 obtained by the manufacturing method according to this embodiment, the transparent plate 20 is attached, via the intermediate film 30 (see FIG. 1A), to the glass panel unit 10 in which the evacuated space 3 is provided between the first glass panel 1 and the second glass panel 2 (see FIG. 1B). Thus, the multi-layer stack 100 has thermal insulation properties and mechanical strength superior to those of the glass panel unit 10.

In addition, according to this embodiment, the pressure applied when the glass panel unit 10 and the transparent plate 20 are assembled together is less than the compressive strength of the spacers 4. This reduces the chances of the spacers 4 collapsing under pressure when the glass panel unit 10 and the transparent plate 20 are assembled together.

If the spacers 4 collapsed under the pressure, then the evacuated space 3 would be compressed to cause a decline in the thermal insulation properties of the multi-layer stack 100. In addition, if the spacers 4 collapsed under the pressure, the mechanical strength of the multi-layer stack 100 would decrease as well. Thus, avoiding the collapse of the spacers 4 under the pressure may reduce the chances of causing a decline in the thermal insulation properties and mechanical strength of the multi-layer stack 100.

Suppose, for example, a situation where the spacers 4 are made of a metallic material such as stainless steel and have a compressive strength equal to or greater than the compressive strength of glass (i.e., a material for the first glass panel 1 or the second glass panel 2). In that case, if the pressure for assembling the glass panel unit 10 and the transparent plate 20 goes beyond a required level, then the metallic spacers 4 might break the first glass panel 1 or the second glass panel 2. According to this embodiment, however, the spacers 4 are made of a resin and the compressive strength of the spacers 4 is less than the compressive strength of glass. This reduces, even if the pressure for assembling the glass panel unit 10 and the transparent plate 20 together goes beyond a required level, the chances of the first glass panel 1 or the second glass panel 2 being broken under the excessive pressure. Note that the spacers 4 do not have to be made of a resin but may also be made of a ceramic or a metallic material.

1-2-1. Multi-Layer Stack

The multi-layer stack 100 according to this embodiment includes the glass panel unit 10, the transparent plate 20, and the intermediate film 30 as shown in FIG. 1A. These constituent elements will be described one by one.

(1) Glass Panel Unit

The glass panel unit 10 includes the first glass panel 1 and the second glass panel 2, which face each other as shown in FIG. 1B. Thus, the first glass panel 1 and the second glass panel 2 are stacked one on top of the other.

The glass panel unit 10 further includes a sealant 5. The sealant 5 is provided between the first glass panel 1 and the second glass panel 2. The sealant 5 according to this embodiment has a frame shape and is used to hermetically bond the first glass panel 1 and the second glass panel 2 together. Thus, in this glass panel unit 10, the first glass panel 1, the sealant 5, and the second glass panel 2 are stacked in this order one on top of another. The sealant 5 may be obtained by, for example, curing a hot glue to be described later.

In addition, the glass panel unit 10 also includes the evacuated space 3. The evacuated space 3 is a space surrounded with the first glass panel 1, the second glass panel 2, and the sealant 5.

The glass panel unit 10 further includes a plurality of spacers (pillars) 4. The plurality of spacers 4 are provided, in the evacuated space 3, between the first glass panel 1 and the second glass panel 2. These spacers 4 may maintain a predetermined interval (gap distance) between the first glass panel 1 and the second glass panel 2. Optionally, the plurality of spacers 4 may be omitted.

The glass panel unit 10 further includes a gas adsorbent 6. The gas adsorbent 6 is provided in the evacuated space 3. The gas adsorbent 6 may adsorb a gas in the evacuated space 3. Optionally, the gas adsorbent 6 may be omitted.

Next, the first glass panel 1, the second glass panel 2, the sealant 5, the evacuated space 3, the spacers 4, and the gas adsorbent 6 that form the glass panel unit 10 will be described in further detail.

(i) First Glass Panel

The first glass panel 1 is a plate member of glass. The first glass panel 1 may have a rectangular shape in plan view. However, the planar shape of the first glass panel 1 does not have to be rectangular but may also be a triangular or any other polygonal shape, a circular shape, or an elliptical shape. The first glass panel 1 has an outer surface 11, which is a surface exposed to the external environment outside of the glass panel unit 10, and an inner surface 110 (see FIG. 1A), which is a surface facing the second glass panel 2.

The first glass panel 1 may have a flat plate shape or may also have a curved plate shape. That is to say, the outer surface 11 of the first glass panel 1 may be either flat or curved, whichever is appropriate.

Examples of materials for the first glass panel 1 include soda lime glass, high strain point glass, chemically tempered glass, alkali-free glass, quartz glass, Neoceram, and thermally tempered glass. The thickness of the first glass panel 1 is not limited to any particular value but may fall within the range from 1 mm to 10 mm, for example.

Optionally, a low-emissivity film may be provided on the inner surface 110 of the first glass panel 1. In that case, the low-emissivity film is located in the evacuated space 3. The low-emissivity film is a film containing a metal with low emissivity. The low-emissivity film has the capability of reducing the transfer of heat by radiation, and therefore, may reduce the transfer (emission) of the heat, generated by light (radiation) irradiating the outer surface 11 of the first glass panel 1, to the evacuated space 3. Examples of metals having low emissivity include silver.

(ii) Second Glass Panel

The second glass panel 2 is a plate member of glass. The second glass panel 2 has the same planar shape as the first glass panel 1. The second glass panel 2 has an outer surface 12, which is a surface exposed to the external environment outside of the glass panel unit 10, and an inner surface 120 (see FIG. 1A), which is a surface facing the first glass panel 1.

The second glass panel 2 may have a flat plate shape or may also have a curved plate shape. That is to say, the glass panel unit 10 may have a flat plate shape or a curved plate shape, whichever is appropriate. In other words, the outer surface 12 of the second glass panel 2 of the glass panel unit 10 may be either flat or curved, whichever is appropriate.

Examples of materials for the second glass panel 2 include soda lime glass, high strain point glass, chemically tempered glass, alkali-free glass, quartz glass, Neoceram, and thermally tempered glass. The material for the second glass panel 2 may be the same as, or different from, the material for the first glass panel 1. The thickness of the second glass panel 2 is not limited to any particular value but may fall within the range from 1 mm to 10 mm, for example. The thickness of the second glass panel 2 may be the same as, or different from, the thickness of the first glass panel 1.

(iii) Sealant

The sealant 5 is a frame-shaped member (see FIG. 1B). In this embodiment, the first glass panel 1 and the second glass panel 2 have a rectangular shape in plan view, and therefore, the sealant 5 is also a rectangular frame shaped member. The sealant 5 is provided between the first glass panel 1 and the second glass panel 2 to hermetically bond the first glass panel 1 and the second glass panel 2 together.

The sealant 5 is made of a hot glue. As the hot glue, a glass frit such as a low-melting glass frit may be used, for example. Examples of the low-melting glass frit include a bismuth-based glass frit, a lead-based glass frit, and a vanadium-based glass frit. The sealant 5 may contain one or more types of low-melting glass frits selected from this group.

(iv) Evacuated Space

The evacuated space 3 is a space surrounded with the first glass panel 1, the second glass panel 2, and the sealant 5 (see FIG. 1B). More specifically, the evacuated space 3 is an evacuated space surrounded with the inner surface 110 of the first glass panel 1, the inner surface 120 of the second glass panel 2, and the sealant 5.

The evacuated space 3 is suitably a vacuum space, for example. Specifically, the evacuated space 3 is suitably a space evacuated to a degree of vacuum of 0.1 Pa or less. This would improve the thermal insulation properties of the glass panel unit 10.

(v) Spacer

A plurality of spacers 4 are provided in the evacuated space 3 as shown in FIG. 1B. That is to say, a plurality of spacers 4 are arranged between the first glass panel 1 and the second glass panel 2. The plurality of spacers 4 may maintain a predetermined interval between the first glass panel 1 and the second glass panel 2. This ensures a predetermined gap distance between the first glass panel 1 and the second glass panel 2 and also ensures that the thickness of the evacuated space 3 is kept constant.

Each of the spacers 4 is a circular columnar member. The height (i.e., the dimension in the thickness direction) of the spacers 4 may be set appropriately according to the gap distance between the first glass panel 1 and the second glass panel 2. That is to say, the gap distance between the first glass panel 1 and the second glass panel 2 (i.e., the thickness of the evacuated space 3) is defined by the height of the spacers 4. The height of the spacers 4 may fall, for example, within the range from 10 μm to 1000 μm. The diameter of the spacers 4 may fall, for example, within the range from 0.1 mm to 10 mm. For example, spacers 4 with a diameter of 0.5 mm and a height of 100 μm may be used. The shape of the spacers 4 does not have to be circular columnar but may also be a rectangular columnar shape or a spherical shape.

The spacers 4 are suitably transparent. This would make the spacers 4 much less conspicuous in the multi-layer stack 100 and thereby improve the appearance of the multi-layer stack 100.

The spacers 4 according to this embodiment are made of a resin and are suitably made of a polyimide resin, for example. This would reduce the thermal conductivity of the spacers 4 and thereby reduce the transfer of heat between the first glass panel 1 and the second glass panel 2 that are in contact with the spacers 4.

(vi) Gas Adsorbent

The gas adsorbent 6 has the capability of adsorbing gas molecules. The gas adsorbent 6 is placed in the evacuated space 3. The gas adsorbent 6 may adsorb a gas in the evacuated space 3, thus increasing the degree of vacuum in the evacuated space 3 and thereby improving the thermal insulation properties of the glass panel unit 10.

The gas adsorbent 6 may contain, for example, a metallic getter material or a non-metallic getter material. The metallic getter material is a getter material having a metallic surface that may chemically adsorb gas molecules. Examples of the metallic getter materials include zirconium-based (such as Zr—Al and Zr—V—Fe) getter materials and titanium-based getter materials. Each of these metallic getter materials may adsorb molecules of a gas such as $H_2O$, $N_2$, $O_2$, Hz, or $CO_2$. In addition, heating and activating any of these metallic getter materials may also cause the gas molecules, chemically adsorbed into the metallic surface of the metallic getter material, to diffuse inside the metallic getter material. Thus, the gas adsorbent 6 containing the metallic getter material may adsorb molecules of a gas such as $H_2O$, $N_2$, $O_2$, Hz, or $CO_2$ in the evacuated space 3.

The non-metallic getter material is a getter material having a porous structure with the ability to adsorb gas molecules. Examples of the non-metallic getter materials include zeolite-based getter materials, active carbon, and magnesium oxide. The zeolite-based getter material may include ion-exchanged zeolite. In that case, examples of the ion exchange materials include K, $NH_4$, Ba, Sr, Na, Ca, Fe, Al, Mg, Li, H, and Cu. Each of these non-metallic getter materials is able to adsorb molecules of a gas such as a hydrocarbon-based gas (such as $CH_4$ and $C_2H_6$) or ammonia ($NH_3$) gas that a metallic getter material cannot adsorb. In addition, heating and activating any of these non-metallic getter materials may cause the gas molecules, which have been adsorbed into the porous structure of the non-metallic getter material, to be desorbed.

(vii) Method for Manufacturing Glass Panel Unit

The glass panel unit 10 may be manufactured by, for example, the following method.

First, a hot glue is applied in a frame shape onto the inner surface 120 of the second glass panel 2. Next, the first glass panel 1 is laid on top of the second glass panel 2 such that the frame-shaped hot glue is sandwiched between the first glass panel 1 and the second glass panel 2. Then, the space surrounded with the first glass panel 1, the second glass panel 2, and the frame-shaped hot glue is heated. This process step may be performed by heating, in a heating furnace, the multi-layer assembly in which the first glass panel 1 and the second glass panel 2 are stacked one on top of the other with the hot glue interposed between themselves. In this manner, the sealant 5 is formed out of the frame-shaped hot glue. In addition, a gas is exhausted from the space surrounded with the first glass panel 1, the second glass panel 2, and the hot glue, thus creating the evacuated space 3. In this manner, the glass panel unit 10 may be manufactured. Note that the plurality of spacers 4 and the gas adsorbent 6 are arranged along the inner surface 120 of the second glass panel 2 before the first glass panel 1 and the second glass panel 2 are laid one on top of the other with the hot glue interposed between themselves.

(2) Transparent Plate

The transparent plate 20 shown in FIG. 1A is a transparent plate member with light-transmitting properties. The transparent plate 20 not only improves the mechanical strength, thermal insulation properties, and sound insulation of the multi-layer stack 100 but also imparts various functions to the multi-layer stack 100 according to the shape, capability, or any other parameter of the transparent plate 20. The transparent plate 20 is provided for the outer surface 11, 12 of at least one of the first glass panel 1 or the second glass panel 2 of the glass panel unit 10 as described above. In the multi-layer stack 100 according to this embodiment, the transparent plate 20 is provided for the outer surface 11 of the glass panel unit 10 as shown in FIG. 1A. Thus, the transparent plate 20 faces the glass panel unit 10. In addition, the transparent plate 20 also faces the first glass panel 1.

The planar shape of the transparent plate 20 may be the same as the planar shape of the glass panel unit 10, for example. In the multi-layer stack 100 according to this embodiment, the transparent plate 20 has the same planar shape as the first glass panel 1. The glass panel unit 10 may be flat or curved as described above. Accordingly, the transparent plate 20 may also be flat or curved, whichever is appropriate.

The thickness of the transparent plate 20 is not limited to any particular value but suitably falls, for example, within the range from 0.5 mm to 12 mm, and more suitably falls within the range from 1 mm to 6 mm. This may reduce the weight of the multi-layer stack 100 while ensuring sufficient mechanical strength for the multi-layer stack 100.

The material for the transparent plate 20 is not limited to any particular one as long as the material has light-transmitting properties. For example, the transparent plate 20 is suitably made of polycarbonate. In other words, the transparent plate 20 is suitably a polycarbonate plate. This may reduce the weight of the transparent plate 20 and thereby reduce the overall weight of the multi-layer stack 100.

The transparent plate 20 is suitably made of glass, for example. In other words, the transparent plate 20 is suitably a glass pane. This may increase the mechanical strength of the transparent plate 20 and eventually increase the mechanical strength of the multi-layer stack 100. If the transparent plate 20 is made of glass, examples of materials for the transparent plate 20 include annealed glass, chemically tempered glass, and thermally tempered glass.

(3) Intermediate Film

The intermediate film 30 is interposed between the glass panel unit 10 and the transparent plate 20 as described above. Thus, in the multi-layer stack 100 according to this embodiment, the intermediate film 30 is interposed between the first glass panel 1 and the transparent plate 20.

In the multi-layer stack 100, the glass panel unit 10 and the transparent plate 20 are bonded together via this intermediate film 30. In the multi-layer stack 100 according to this embodiment, the first glass panel 1 and the transparent plate 20 are bonded together via the intermediate film 30. Thus, the intermediate film 30 is suitably provided over not only the entire surface of the (first glass panel 1 of the) glass panel unit 10 but also the entire surface of the transparent plate 20. The planar shape of the intermediate film 30 is suitably the same as not only that of the (first glass panel 1 of the) glass panel unit 10 but also that of the transparent plate 20 as well.

The thickness of the intermediate film 30 is not limited to any particular value as long as the intermediate film 30 may bond the (first glass panel 1 of the) glass panel unit 10 and the transparent plate 20 together but suitably falls, for example, within the range from 0.3 mm to 4 mm and more suitably falls within the range from 0.3 mm to 2 mm. This allows the glass panel unit 10 to hold the transparent plate 20 more easily and also facilitates maintaining the light-transmitting properties of the multi-layer stack 100.

The material for the intermediate film 30 is not limited to any particular one as long as the intermediate film 30 may bond the (first glass panel 1 of the) glass panel unit 10 and the transparent plate 20 together and has light-transmitting properties. For example, the intermediate film 30 is suitably made of a sheet-shaped resin with light-transmitting properties and is more suitably a sheet of a thermoplastic resin. The intermediate film 30 may be configured as a single sheet of resin or a multi-layer stack made up of multiple sheets of resin. If the intermediate film 30 is configured as a multi-layer stack of multiple sheets of resin, some matter may be interposed between the multiple sheets of resin to improve its design and decorativeness. Examples of such interposed materials include a polyethylene terephthalate (PET) film, a sheet of metal foil, and a plant.

The intermediate film 30 is suitably made of a polyvinyl butyral (PVB) resin, for example. The PVB resin is suitable because the PVB resin not only is able to bond the glass panel unit 10 and the transparent plate 20 firmly but also has excellent transparency. In addition, the PVB resin may also increase the mechanical strength of the multi-layer stack 100. Moreover, the PVB resin increases the anti-penetration ability of the multi-layer stack 100 as well. Thus, if the multi-layer stack 100 is required to have high mechanical strength, then the intermediate film 30 is suitably made of a PVB resin.

The intermediate film 30 is also suitably made of an ethylene vinyl acetate (EVA) copolymer resin (hereinafter referred to as an "EVA resin"). The EVA resin is suitable due to its excellent transparency and flexibility. In addition, the EVA resin also increases the anti-scattering ability of the multi-layer stack 100. Furthermore, the EVA resin also allows the glass panel unit 10 and the transparent plate 20 to be bonded at a relatively low temperature via the intermediate film 30. Moreover, the EVA resin increases the transportability of the multi-layer stack 100 as well. Thus, in this embodiment, the intermediate film 30 suitably includes at least one of the PVB resin or the EVA resin.

The intermediate film 30 is also suitably made of a liquid curable resin, for example. The liquid curable resin is suitably either a thermosetting resin or a UV curable resin. If the intermediate film 30 is made of a thermosetting resin, the intermediate film 30 suitably includes not only the thermosetting resin but also a curing agent as well. On the other hand, if the intermediate film 30 is made of a UV curable resin, then the intermediate film 30 suitably includes not only the UV curable resin but also a photopolymerization initiator as well. Examples of such curable resins include an acrylic resin. That is to say, the intermediate film 30 is suitably made of an acrylic resin as well.

The multi-layer stack 100 according to this embodiment may be manufactured by performing, for example, the following process steps. Note that the following method for manufacturing the multi-layer stack 100 is only an example and should not be construed as limiting.

First, the glass panel unit 10, the transparent plate 20, and the intermediate film 30 are provided. Next, the glass panel unit 10 and the transparent plate 20 are assembled together via the intermediate film 30 (see FIG. 2). More specifically, the outer surface 11, 12 of at least one of the first glass panel 1 or the second glass panel 2 of the glass panel unit 10 and the transparent plate 20 are assembled together via the intermediate film 30.

Figure 2:
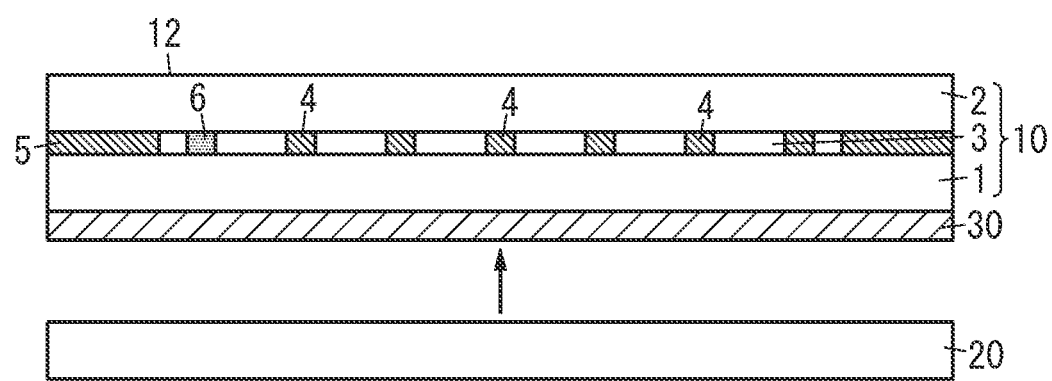
FIG. 2 is a schematic cross-sectional view illustrating an exemplary method for manufacturing the multi-layer stack.

In this embodiment, the outer surface 11 of the first glass panel 1 and the transparent plate 20 are assembled together via the intermediate film 30 made of a sheet of resin as shown in FIG. 2. In this manner, the multi-layer stack 100 shown in FIG. 1A is obtained.

If the pressure applied when the glass panel unit 10 and the transparent plate 20 are assembled together were too high, then the plurality of resin spacers 4 included in the glass panel unit 10 would collapse under the excessive pressure. In that case, this would cause damage to the glass panel unit 10 or cause a decline in the thermal insulation properties, the mechanical strength, or other properties of the glass panel unit 10.

In this respect, in the manufacturing method according to this embodiment, the pressure applied when the glass panel unit 10 and the transparent plate 20 are assembled together is, for example, 0.1 MPa or less, which is less than the compressive strength of the plurality of spacers 4. This reduces the chances of the plurality of spacers 4 collapsing under the excessive pressure. As used herein, the "pressure applied for assembling the glass panel unit 10 and the transparent plate 20 together" refers to the pressure applied to the glass panel unit 10 and the transparent plate 20 when the glass panel unit 10 and the transparent plate 20 are assembled together.

In this embodiment, the pressure applied when the glass panel unit 10 and the transparent plate 20 are assembled together is suitably equal to or lower than 3 atmosphere [atm] ($\simeq$0.3 Mpa), and more suitably equal to or lower than 1 atm ($\simeq$0.1 Mpa). The lower limit value of the pressure applied for assembling is not limited to any particular value as long as the glass panel unit 10 and the transparent plate 20 may be assembled together, but is suitably equal to or greater than 0.2 atm ($\simeq$0.02 Mpa) and more suitably equal to or greater than 0.3 atm ($\simeq$0.03 Mpa). This may further reduce the chances of the plurality of resin spacers 4 collapsing under the excessive pressure, particularly when the spacers 4 are made of a polyimide resin. That is to say, the pressure applied for assembling suitably falls within the range from 0.2 atm to 3 atm and more suitably falls within the range from 0.2 atm to 1 atm. Note that the pressure applied for assembling the glass panel unit 10 and the transparent plate 20 together is not limited to any particular value.

In general, to bond the glass panel unit 10 and the transparent plate 20 together with the intermediate film 30 made of a PVB resin, heat and pressure need to be applied with an autoclave machine used. The pressure applied is usually 13 atm ($\simeq$1.3 Mpa), for example. Depending on the condition for applying heat and pressure, however, the spacers 4 included in the glass panel unit 10 would be deformed or the first glass panel 1, the second glass panel 2, or other members of the glass panel unit 10 would be damaged or deformed, for example.

In contrast, the PVB resin may bond the glass panel unit 10 and the transparent plate 20 only by heating, without using any autoclave machine, by reducing the moisture content thereof. This allows the glass panel unit 10 and the transparent plate 20 to be bonded together only by heating by drying the intermediate film 30 made of the PVB resin and then bonding the glass panel unit 10 and the transparent plate 20 via the intermediate film 30.

According to an exemplary method for drying the intermediate film 30, a vacuum pump may be connected to a large chamber in which a desiccant such as a silica gel is put, only the intermediate film 30 may be loaded, as either a roll or a flat film, into the large chamber, and then the inside of the large chamber may be evacuated with the vacuum pump to maintain a predetermined degree of vacuum. According to this method, the intermediate film 30 may be dried and may have its moisture content decreased. The dried intermediate film 30 made of the PVB resin is heated while being sandwiched between the glass panel unit 10 and the transparent plate 20. In this manner, the glass panel unit 10 and the transparent plate 20 are bonded together via the intermediate film 30.

Another method for drying the intermediate film 30 may be as follows, for example. According to this method, the intermediate film 30 is placed, for example, in a low-humidity environment (e.g., in a large chamber in which a desiccant such as a silica gel is put and to which a vacuum pump is connected) while being sandwiched between the glass panel unit 10 and the transparent plate 20, and then the low-humidity environment is evacuated with the vacuum pump to maintain a predetermined degree of vacuum. According to this method, the intermediate film 30 made of the PVB resin, for example, may be dried and may have its moisture content decreased.

The condition for drying the intermediate film 30 by itself or the intermediate film 30 sandwiched between the glass panel unit 10 and the transparent plate 20 may be set as appropriate depending on the dimensions, the thickness, or any other parameter of the intermediate film 30. For example, the intermediate film 30 is suitably dried for at least 12 hours (suitably 48 hours or more) with the pressure inside the chamber reduced to 0.1 atm ($\approx$0.01 MPa) or less.

To accelerate drying the intermediate film 30 sandwiched between the glass panel unit 10 and the transparent plate 20, a space is suitably provided between the transparent plate 20 (or the glass panel unit 10) and a base on which the transparent plate 20 is mounted. In that case, plate-shaped spacers are suitably provided, for example, at the four corners of the transparent plate 20 (or the glass panel unit 10). In addition, the thickness of these spacers is suitably equal to or greater than the thickness of the intermediate film 30, for example. That is to say, the space between the transparent plate 20 (or the glass panel unit 10) and the mount base is suitably at least as thick as the intermediate film 30.

In this embodiment, before the glass panel unit 10 and the transparent plate 20 are assembled together, the intermediate film 30 is dried to a moisture content falling within the range from 0.1% by weight to 0.5% by weight and is suitably dried to a moisture content falling within the range from 0.15% by weight to 0.3% by weight. The glass panel unit 10 and the transparent plate 20 may be bonded together only by heating, without using any autoclave machine, by drying the intermediate film 30 and thereby decreasing its moisture content as described above. Thus, decreasing the moisture content of the intermediate film 30 to the range from 0.1% by weight to 0.5% by weight enables assembling the glass panel unit 10 and the transparent plate 20 together via the intermediate film 30 made of the PVB resin, while reducing the deformation of the spacers 4 and the damage and deformation of the first glass panel 1 and the second glass panel 2.

Also, in a situation where the intermediate film 30 is made of the PVB resin, if the moisture content of the intermediate film 30 is less than 0.1% by weight, then the bond strength would be so high as to cause a decline in the anti-penetration ability of the film. On the other hand, if the moisture content of the intermediate film 30 is greater than 0.5% by weight, then the intermediate film 30 would lose its transparency or produce bubbles therein after going through the assembling process. Therefore, decreasing the moisture content of the intermediate film 30 made of the PVB resin sheet to the range from 0.1% by weight to 0.5% by weight, suitably to the range from 0.15% by weight to 0.3% by weight, may reduce the chances of causing a decline in the anti-penetration ability of the intermediate film 30, loss of its transparency, and/or production of bubbles therein.

In addition, applying non-uniform pressure to the intermediate film 30 while assembling the glass panel unit 10 and the transparent plate 20 together via the intermediate film 30 made of the PVB resin is another cause of the loss of transparency of the intermediate film 30 and/or the production of bubbles therein. Thus, when assembled together, the glass panel unit 10 and the transparent plate 20 are suitably pressed so that pressure is applied uniformly to the intermediate film 30.

In general, when the intermediate film 30 made of an EVA resin is used, then the glass panel unit 10 and the transparent plate 20 may be bonded together even at a lower heating temperature than the PVB resin. Thus, bonding the glass panel unit 10 and the transparent plate 20 together via the intermediate film 30 made of the EVA resin may reduce the chances of causing deformation of the spacers 4 included in the glass panel unit 10 and deformation, damage, and other inconveniences of the first glass panel 1 and second glass panel 2 thereof.

Figure 3:
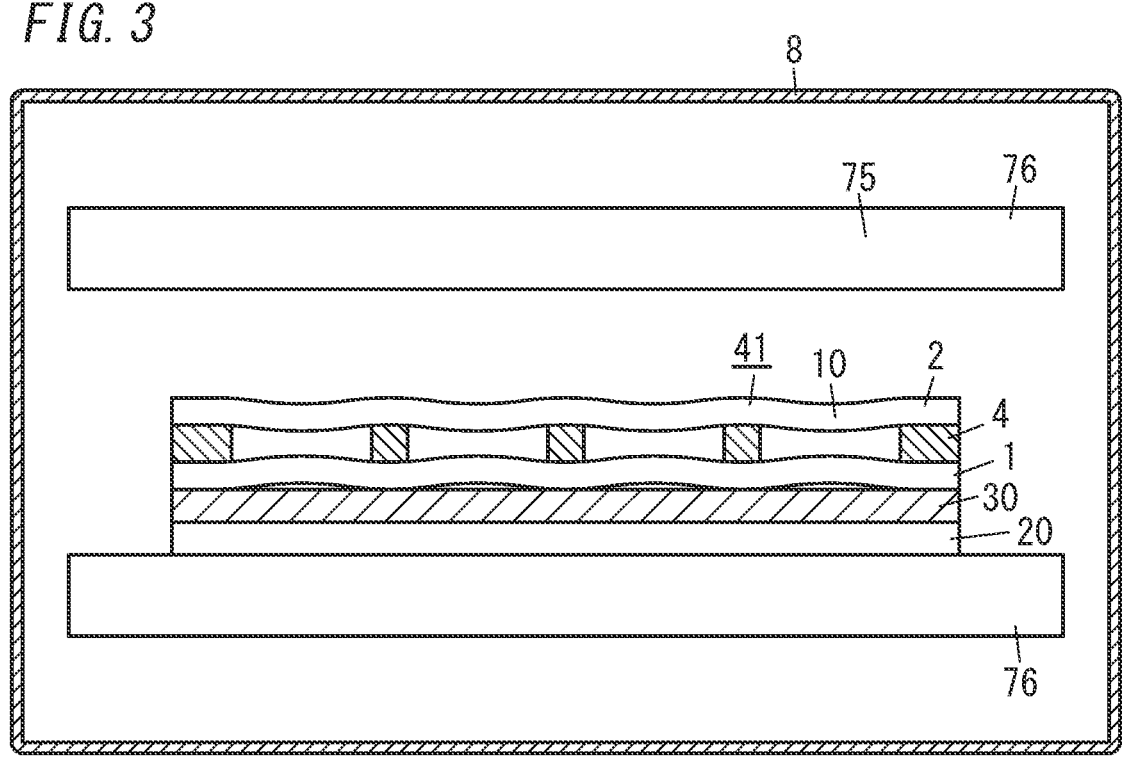
FIG. 3 is a schematic cross-sectional view illustrating a method for manufacturing the multi-layer stack and showing a state where a multi-layer assembly is loaded inside a chamber.

An air pressure difference is caused between the air pressure in the evacuated space 3 of the glass panel unit 10 and the atmospheric pressure in the external environment. For example, if a glass pane with a small thickness (e.g., equal to or less than 3 mm, or even 2 mm or less) is used as each of the first glass panel 1 and the second glass panel 2 of the glass panel unit 10, then a phenomenon that the first glass panel 1 and the second glass panel 2 are flexed significantly as shown in FIG. 3 could be caused due to the air pressure difference. That is to say, a phenomenon that the first glass panel 1 and the second glass panel 2 are flexed and depressed toward the evacuated space 3 between the spacers 4 could be caused in some cases.

In addition, in the case of such a glass panel unit 10 of which the first glass panel 1 and the second glass panel 2 are flexed, a phenomenon that an image seen through the glass panel unit 10 (i.e., a transmitted image) and an image reflected from the glass panel unit 10 (i.e., a reflected image) look distorted is observed. Furthermore, if a multi-layer stack 100 is formed by attaching a transparent plate 20 to such a glass panel unit 10 of which the first glass panel 1 and the second glass panel 2 are flexed, then the intermediate film 30 thereof also becomes uneven due to the flexure of the first glass panel 1 and the second glass panel 2 of the glass panel unit 10. In that case, even if the transparent plate 20 of the multi-layer stack 100 has a flat surface, both a transmitted image and a reflected image produced through the multi-layer stack 100 could look distorted due to the flexure of the first glass panel 1 and the second glass panel 2 and the unevenness of the intermediate film 30.

Thus, according to this embodiment, the glass panel unit 10 and the transparent plate 20 are assembled together by, for example, the following assembling method using a vacuum chamber. According to the assembling method using a vacuum chamber, the process of assembling the glass panel unit 10 and the transparent plate 20 together is performed inside an evacuated chamber (vacuum chamber) 8. Such an assembling method using a vacuum chamber enables assembling the glass panel unit 10 and the transparent plate 20 together via the intermediate film 30 with the first glass panel 1 and the second glass panel 2 either not flexed or hardly flexed between the spacers 4. Note that the inside of the chamber 8 when the glass panel unit 10 and the transparent plate 20 are assembled together needs to be evacuated to at least a pressure lower than the atmospheric pressure. Thus, the pressure inside the chamber 8 when the glass panel unit 10 and the transparent plate 20 are assembled together is not limited to any particular value.

Figure 4:
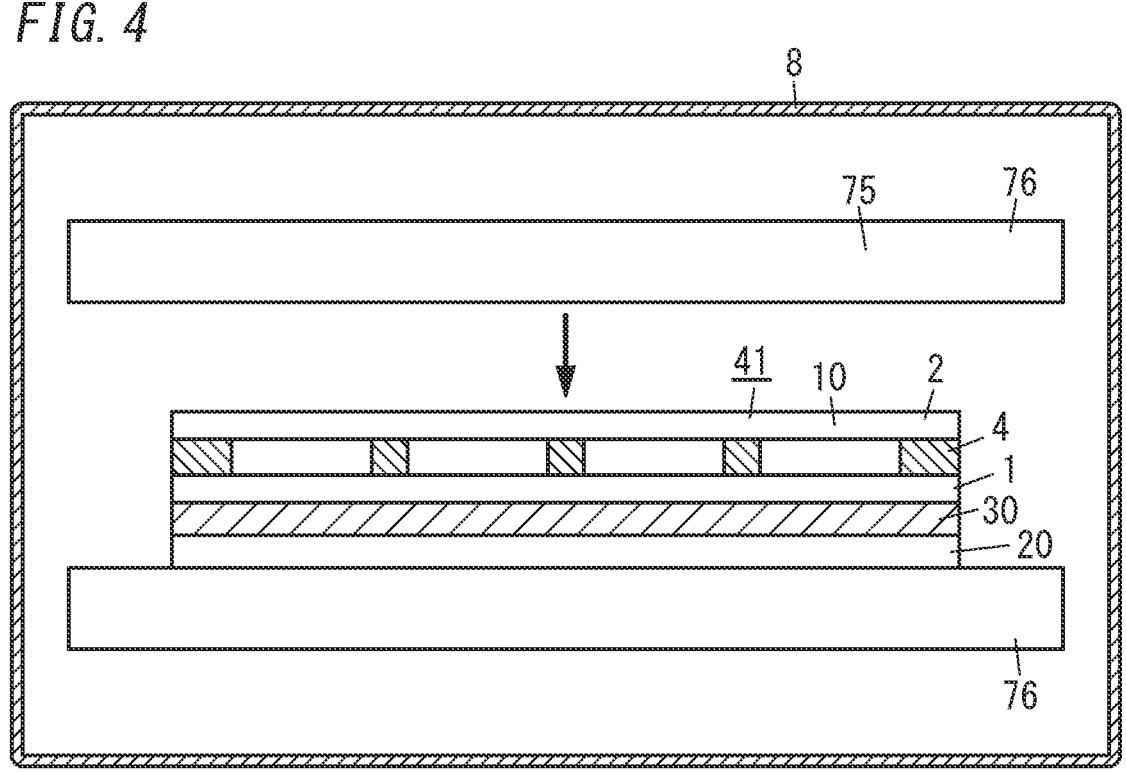
FIG. 4 is a schematic cross-sectional view showing a state where the chamber shown in FIG. 3 is evacuated.
Figure 5:
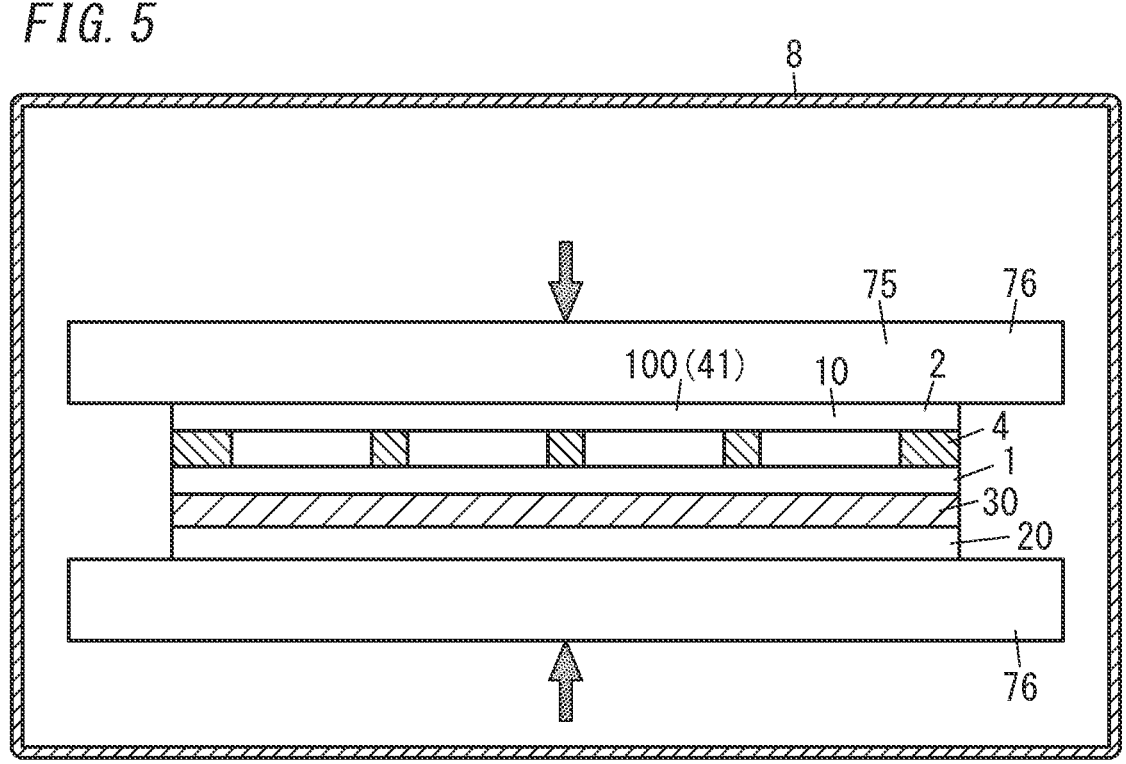
FIG. 5 is a schematic cross-sectional view showing a state where the multi-layer assembly shown in FIG. 4 is heated.

The process using the vacuum chamber (hereinafter simply referred to as a "vacuum chamber process") may be performed, for example, by loading the glass panel unit 10, the intermediate film 30, and transparent plate 20 into the chamber 8 and assembling the glass panel unit 10 and the transparent plate 20 together via the intermediate film 30 while evacuating the chamber 8 as shown in FIGS. 3-5.

According to the vacuum chamber process as shown in FIGS. 3-5, the chamber 8 and a heater device 75 installed inside the chamber 8 are used. The heater device 75 includes a pair of heaters 76, which are arranged to be spaced from each other in the upward/downward direction.

According to the vacuum chamber process as shown in FIGS. 3-5, first, a multi-layer assembly 41 including the glass panel unit 10, the intermediate film 30, and the transparent plate 20 is loaded into the chamber 8 as shown in FIG. 3. At this time, the multi-layer assembly 41 is in a state where the glass panel unit 10 is stacked over the transparent plate 20 with the intermediate film 30 interposed between them.

Next, the chamber 8 is evacuated using a rotary pump, for example, thereby reducing the flexure of the first glass panel 1 and the second glass panel 2 as shown in FIG. 4. In this case, the inside of the chamber 8 is evacuated to, for example, 0.2 atm ($\approx$0.02 MPa).

Subsequently, as shown in FIG. 5, the multi-layer assembly 41 is sandwiched between, and heated by, the pair of heaters 76 provided over and under the multi-layer assembly 41, thus causing the intermediate film 30 to be melted and softened. In addition, the multi-layer assembly 41 is also compressed, thus exhausting air bubbles out of the intermediate film 30. In this process step, the multi-layer assembly 41 is pressed by the pair of heaters 76 with force less than the compressive strength of the spacers 4 (e.g., force of 1 atm ($\approx$0.1 MPa)).

Thereafter, with the multi-layer assembly 41 kept compressed by the pair of heaters 76, the heaters 76 are powered OFF to stop heating the multi-layer assembly 41 and cool the multi-layer assembly 41. This causes the temperature of the multi-layer assembly 41 to fall and the intermediate film 30 to be cured, thus forming a multi-layer stack 100 in which the glass panel unit 10 and the transparent plate 20 are bonded together via the intermediate film 30.

Next, the pressure inside the chamber 8 is restored to the atmospheric pressure and the multi-layer stack 100 is unloaded from the chamber 8. Note that the inside of the chamber 8 is kept evacuated at least until the intermediate film 30 is cured since the first glass panel 1 and the second glass panel 2 have had their flexure reduced. In addition, the means for heating the multi-layer assembly 41 does not have to be the heater device 75. Alternatively, the multi-layer assembly 41 may also be heated by an infrared ray, for example.

Figure 6:
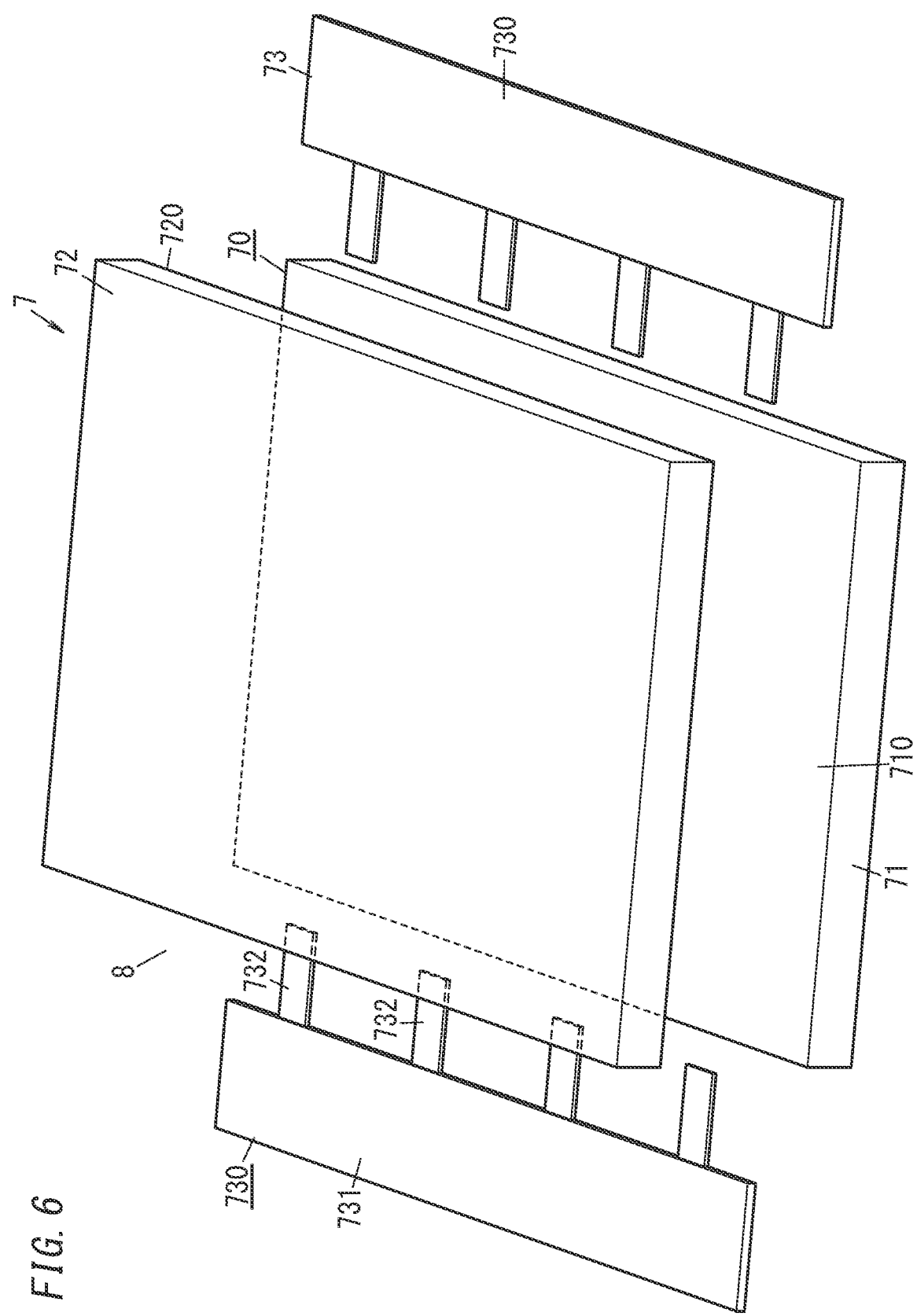
FIG. 6 is a perspective view of an assembling apparatus for use in the method for manufacturing a multi-layer stack.

The vacuum chamber process may be performed using the assembling apparatus 7 shown in FIG. 6. The assembling apparatus 7 is installed in the chamber 8 that may be evacuated. The assembling apparatus 7 includes a press machine 70. The press machine 70 is used to press the multi-layer assembly 41 (see FIG. 11). The multi-layer assembly 41 includes the glass panel unit 10, the transparent plate 20, and the intermediate film 30 sandwiched between the glass panel unit 10 and the transparent plate 20.

The press machine 70 includes a bearer 71 for supporting the multi-layer assembly 41 thereon and a press member 72 for sandwiching the multi-layer assembly 41 between the bearer 71 and itself by being brought up and down over the bearer 71. The bearer 71 may be formed, for example, in the shape of a plate, and has a supporting surface 710 configured as a horizontal upper surface. The press member 72 may be formed, for example, in the shape of a plate, and has a pressing surface 720 configured as a horizontal lower surface.

Figure 7:
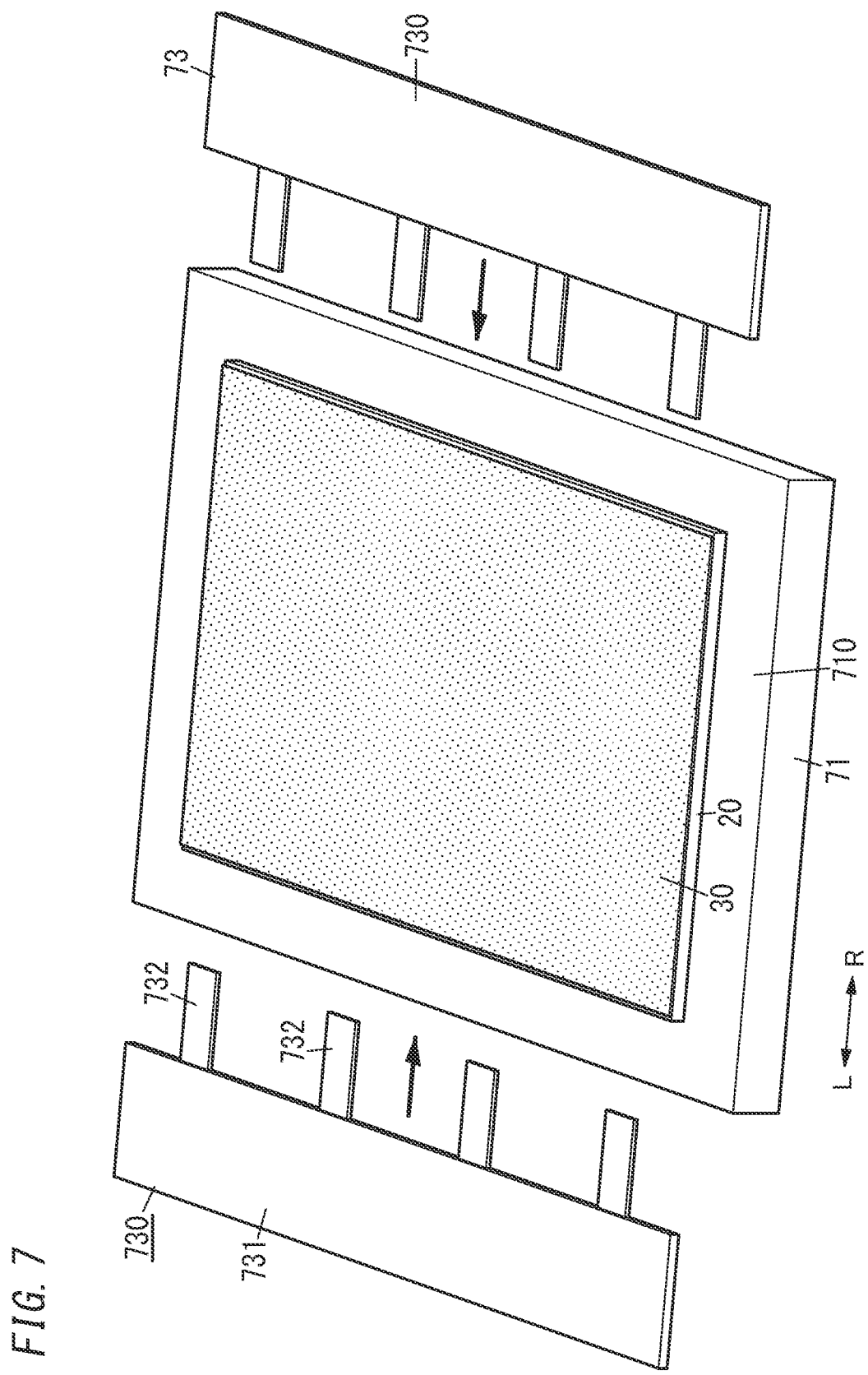
FIG. 7 is a perspective view showing a state where a transparent plate and an intermediate film are set in the assembling apparatus.

The assembling apparatus 7 further includes an elevator device 73. The elevator device 73 supports the glass panel unit 10 over the bearer 71 and brings the glass panel unit 10 up and down in that state. The elevator device 73 includes a pair of supporting members 730. The pair of supporting members 730 are provided to be spaced from each other in the rightward/leftward direction. As used herein, the "rightward/leftward direction" is the direction parallel to the width of the transparent plate 20 in a state where the transparent plate 20 is supported by the bearer 71 as shown in FIG. 7.

Each supporting member 730 includes a base 731 and a plurality of supporting portions 732 protruding from the base 731 toward the other supporting member 730. Each supporting member 730 is movable in the upward/downward direction and the rightward/leftward direction. Each supporting member 730 is driven in the upward/downward direction and the rightward/leftward direction by, for example, a driving unit including a ball screw, a linear actuator, a motor, and other members.

In the press machine 70 shown in FIG. 6, the press member 72 is elevated by motive power generated by a motor such as an electric motor. Each of the bearer 71 and the press member 72 includes a heater. The press machine 70 presses the multi-layer assembly 41 put on the supporting surface 710 of the bearer 71 with the bearer 71 and the press member 72 heated by their own heater.

The glass panel unit 10 and the transparent plate 20 may be assembled together using the assembling apparatus 7 in the following manner, for example. In the following description, a situation where an intermediate film 30 made of a PVB resin is used as the intermediate film 30 will be described.

First, as shown in FIG. 7, the transparent plate 20 is mounted on the supporting surface 710 of the bearer 71 with one surface thereof in the thickness direction facing down, and the intermediate film 30 is put on the transparent plate 20 with one surface thereof in the thickness direction facing down. At this time, the respective supporting members 730 of the elevator device 73 are arranged at first positions where the supporting members 730 are located above the intermediate film 30 and outwardly spaced from the intermediate film 30 in the rightward/leftward directions.

Figure 8:
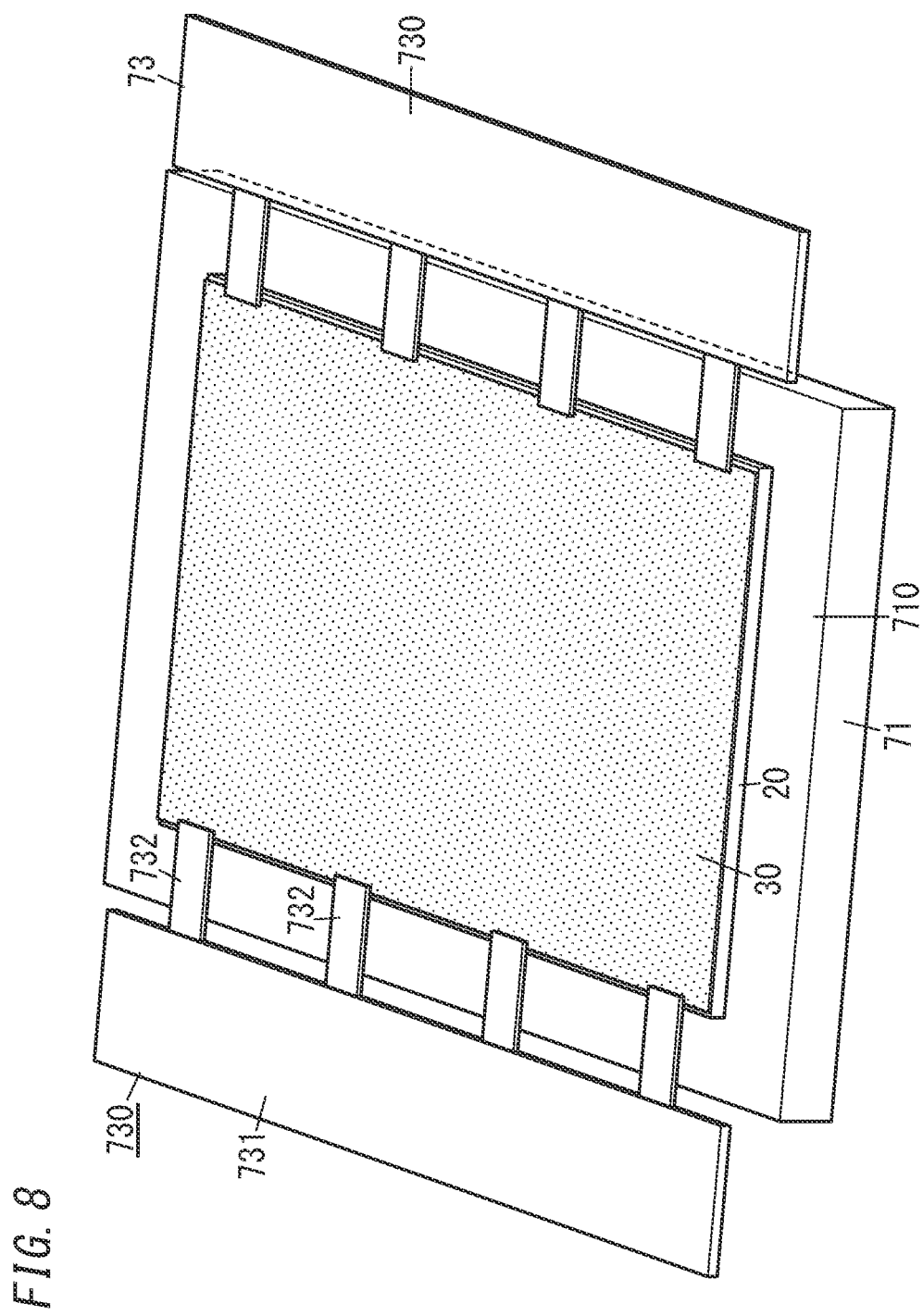
FIG. 8 is a perspective view showing a state where a pair of supporting members included in the assembling apparatus are placed at second positions.

Next, the respective supporting members 730 of the elevator device 73 are driven in the rightward/leftward directions and thereby placed at the second positions shown in FIG. 8. When the respective supporting members 730 are placed at the second positions, the respective tip portions of the plurality of supporting portions 732 of each supporting member 730 are located above the intermediate film 30.

Figure 9:
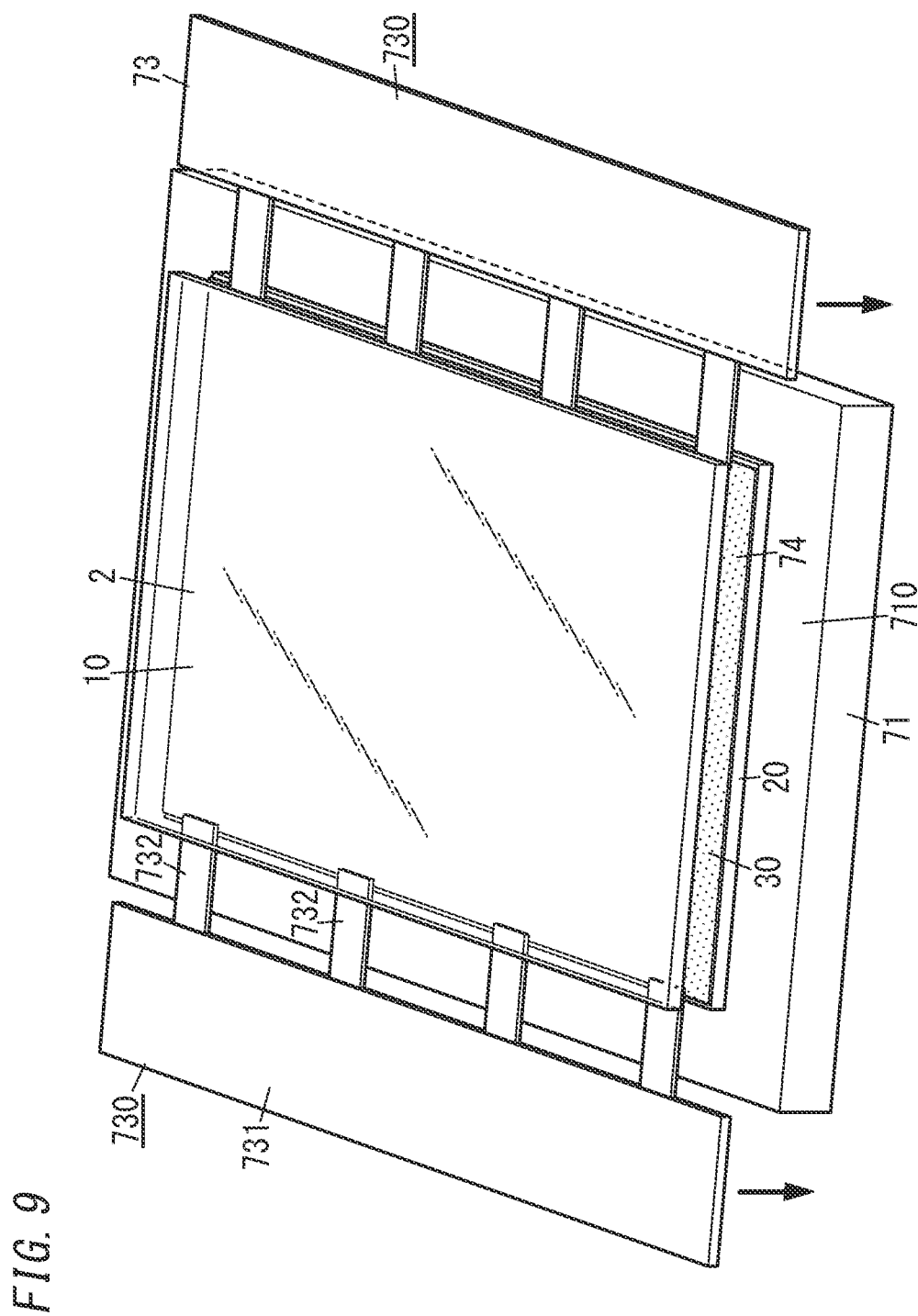
FIG. 9 is a perspective view showing a state where the glass panel unit is set in the assembling apparatus.

Subsequently, as shown in FIG. 9, the glass panel unit 10 is put on the respective tip portions of the plurality of supporting portions 732 of the supporting members 730 with one surface thereof in the thickness direction facing down. At this time, the lower surface of the glass panel unit 10, which is either the outer surface 11 of the first glass panel 1 or the outer surface 12 of the second glass panel 2, is located at a predetermined gap distance over the upper surface of the intermediate film 30, thus leaving a gap 74 between the glass panel unit 10 and the intermediate film 30. Evacuating the inside of the chamber 8 with such a gap 74 left accelerates drying the intermediate film 30. Note that the predetermined gap distance preferably falls within the range from 1 mm to 7 mm, and more preferably falls within the range from 3 mm to 5 mm, to accelerate drying the intermediate film 30. Also, the inside of the chamber 8 may have been evacuated before the gap 74 is created or may be evacuated after the gap 74 has been created. In any case, the inside of the chamber 8 will be kept evacuated at least until the intermediate film 30 is cured as will be described later.

Figure 10:
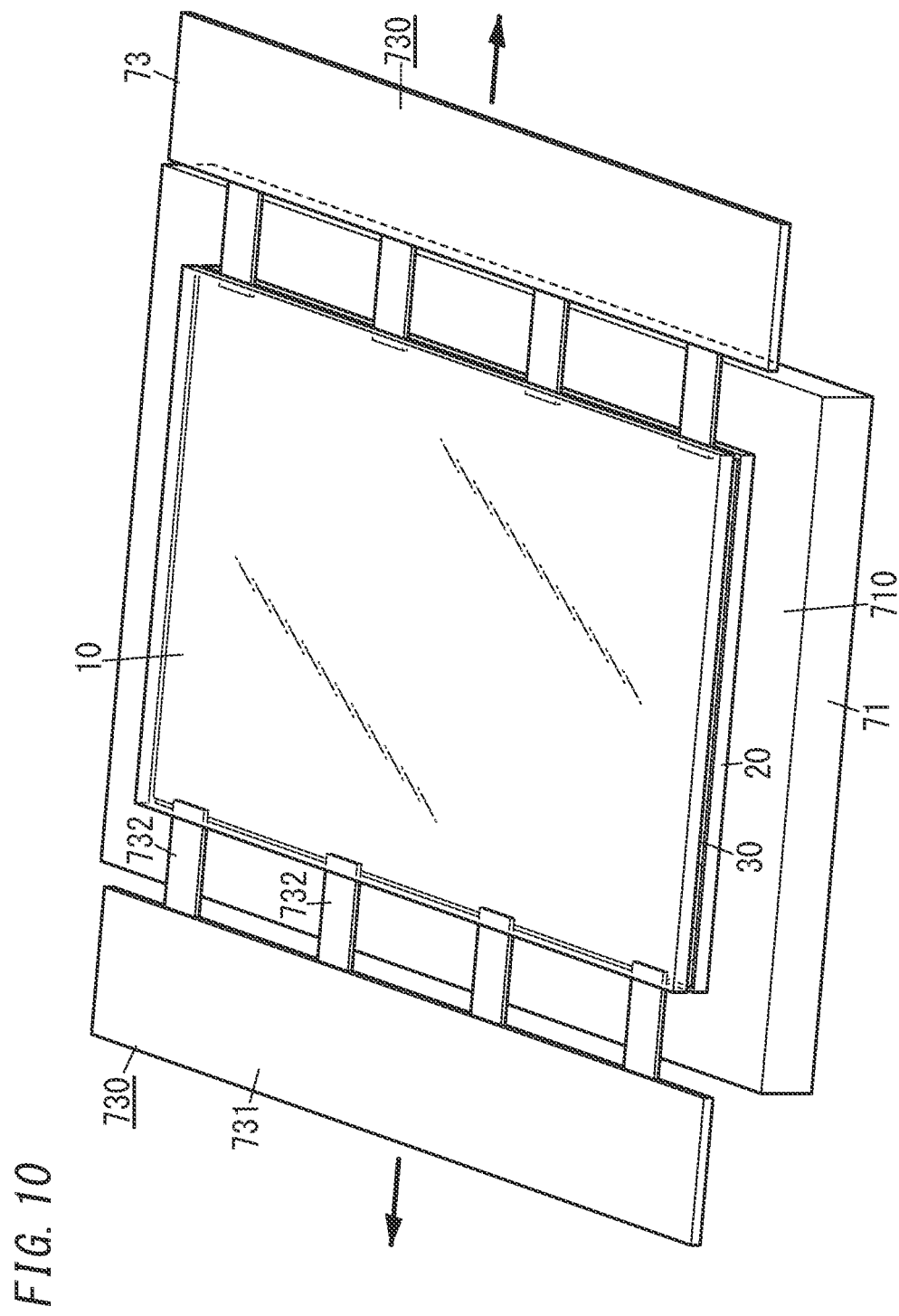
FIG. 10 is a perspective view showing a state where the pair of supporting members are placed at third positions.

After the intermediate film 30 has been dried as described above for a predetermined period of time, the respective supporting members 730 of the elevator device 73 are driven downward to be placed at the third positions shown in FIG. 10. When the respective supporting members 730 are placed at the third positions, the respective tip portions of the plurality of supporting portions 732 of the supporting members 730 either come into contact with, or are located in the vicinity of, the upper surface of the intermediate film 30. In this case, the glass panel unit 10 supported by the elevator device 73 is brought down to have the lower surface of the glass panel unit 10 brought either to the vicinity of, or into contact with, the upper surface of the intermediate film 30.

Figure 11:
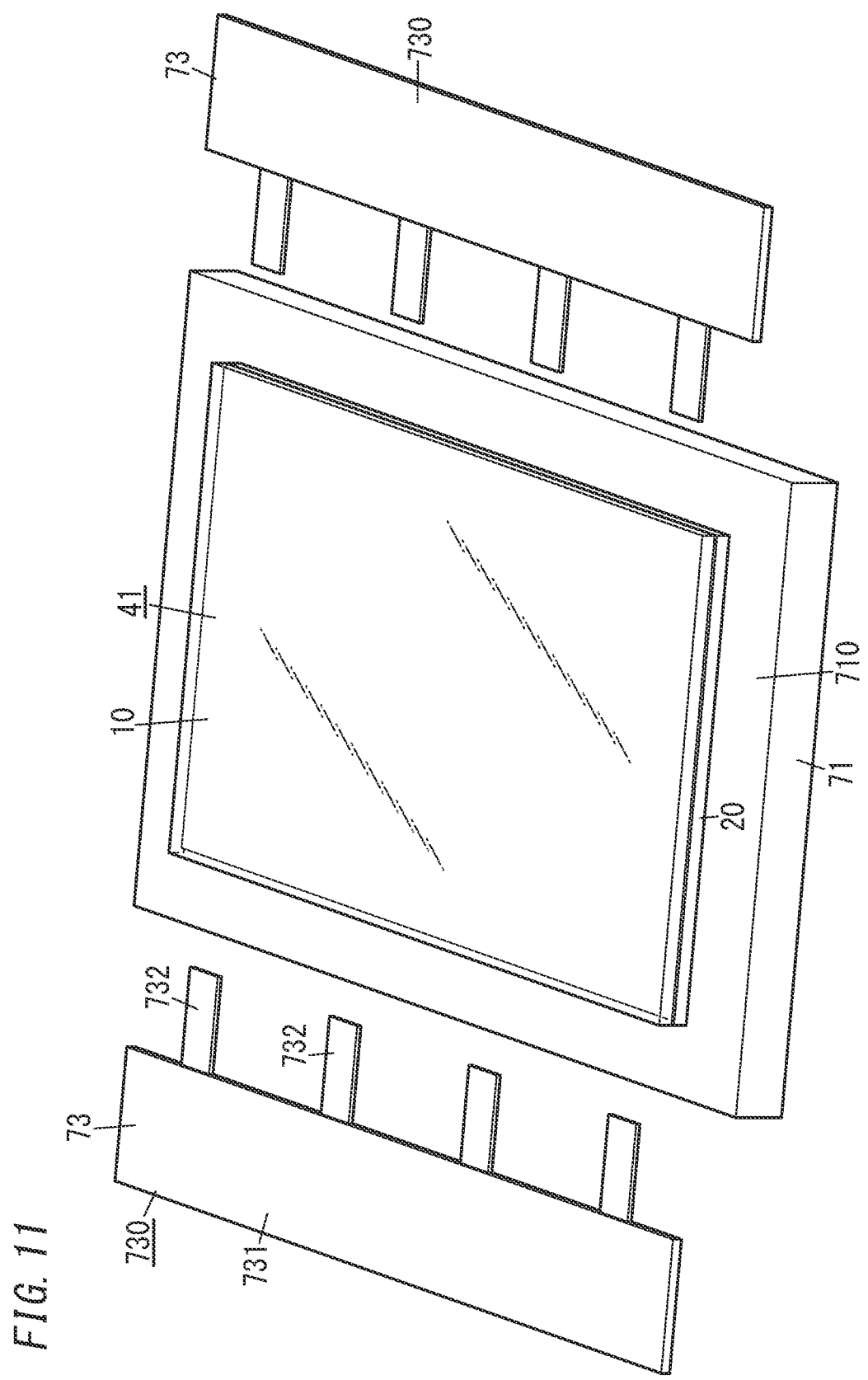
FIG. 11 is a perspective view showing a state where the pair of supporting members are placed at fourth positions.

Thereafter, the respective supporting members 730 of the elevator device 73 are driven in the rightward/leftward directions such that the respective supporting members 730 are placed at fourth positions where the supporting members 730 are located above the intermediate film 30 and outwardly spaced from the intermediate film 30 in the rightward/leftward directions as shown in FIG. 11. As a result, the glass panel unit 10 comes to be supported only by the transparent plate 20 via the intermediate film 30.

Figure 12:
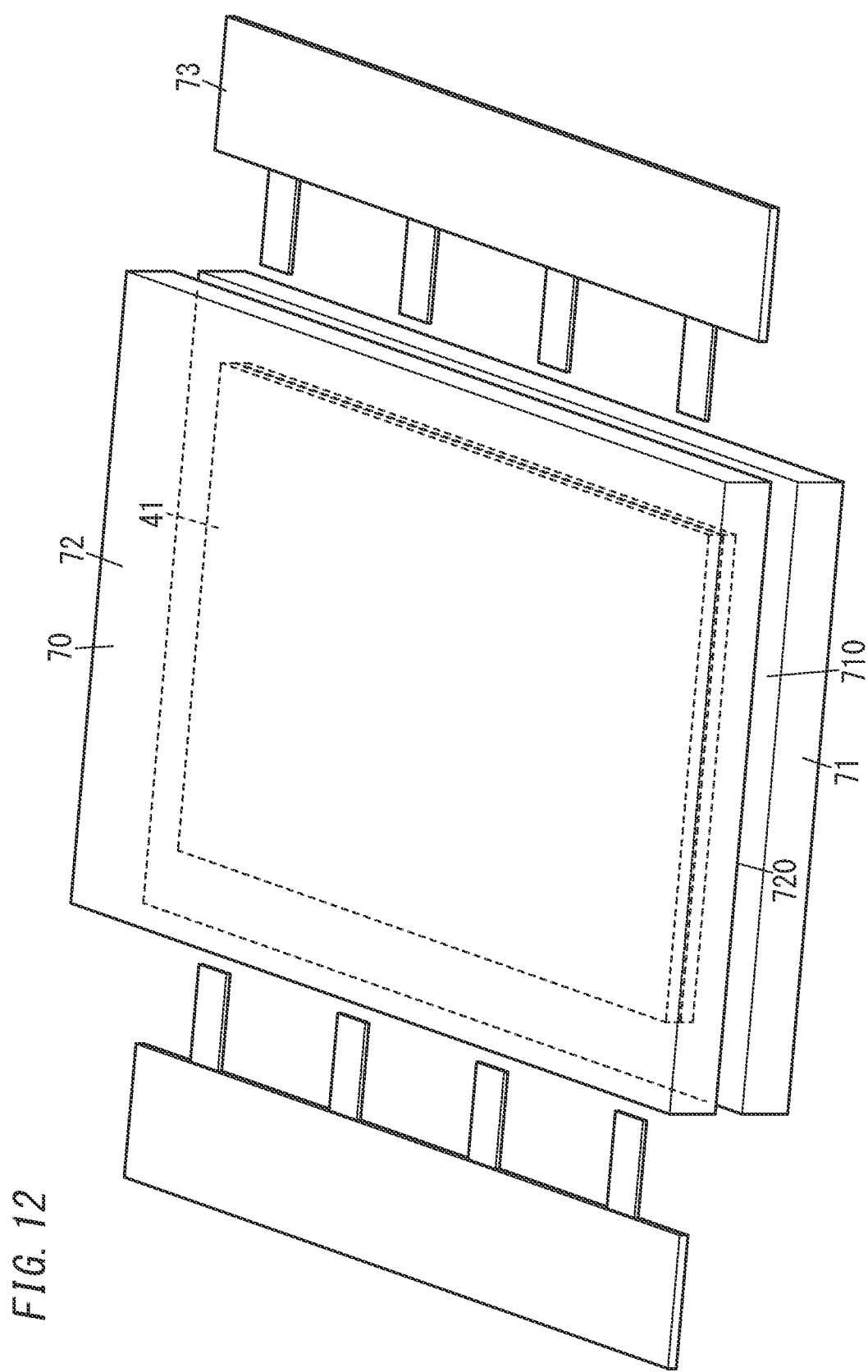
FIG. 12 is a perspective view showing a state where a transparent plate, an intermediate film, and the glass panel unit are pressed by the assembling apparatus.

Next, the press member 72 of the press machine 70 is driven downward, thereby making the pressing surface 720 of the press member 72 and the supporting surface 710 of the bearer 71 press the multi-layer assembly 41 including the transparent plate 20, the intermediate film 30, and the glass panel unit 10 as shown in FIG. 12. In the meantime, the press member 72 is heated by the heater built in the press member 72 itself. The bearer 71 is also heated by the heater built in the bearer 71 itself. That is to say, the multi-layer assembly 41 is pressed by the press member 72 and bearer 71 that are being heated. Thus, the intermediate film 30 is softened by the heat transferred from the press member 72 and the bearer 71 and the glass panel unit 10 and the transparent plate 20 are assembled together via the intermediate film 30 thus softened. Note that the intermediate film 30 softened may have been melted.

The press member 72 and the bearer 71 may start to be heated by their own heater either before or after the multi-layer assembly 41 starts to be pressed by the press machine 70, whichever is appropriate. In addition, the thermal conductivity of the glass panel unit 10 is lower than the thermal conductivity of the transparent plate 20. Thus, not both the press member 72 and the bearer 71 but only the bearer 71 may be heated by its own heater.

After the multi-layer assembly 41 has been pressed by the press machine 70 as described above, the press member 72 and the bearer 71 stop being heated by their own heater. This causes the intermediate film 30 to be cooled and cured, thus forming a multi-layer stack 100 in which the glass panel unit 10 and the transparent plate 20 are bonded together via the intermediate film 30.

The vacuum chamber process as described above may reduce the air pressure difference between the evacuated space 3 of the glass panel unit 10 and the external environment during the assembling process, thus enabling reducing the flexure of the glass panel unit 10 during the assembling process.

In particular, this process is advantageous when the transparent plate 20 is a glass pane (such as float glass) having greater rigidity than at least the glass panel to which the transparent plate 20 is attached and which is either the first glass panel 1 or the second glass panel 2. In that case, even if the multi-layer stack 100 is exposed to the air after the glass panel unit 10 and the transparent plate 20 have been assembled together, the glass panel unit 10 included in the multi-layer stack 100 may have its flexure between the spacers 4 reduced by the transparent plate 20 having the greater rigidity. Consequently, this may reduce the chances of causing the phenomenon that both a transmitted image and a reflected image look distorted through the multi-layer stack 100. Optionally, the rigidity of the transparent plate 20 may be greater than both the rigidity of the first glass panel 1 and the rigidity of the second glass panel 2. Alternatively, the transparent plate 20 may have as high rigidity as, or lower rigidity than, the first or second glass panel 1, 2 to which the transparent plate 20 is attached.

In addition, the vacuum chamber process described above may also reduce the humidity in the chamber 8. This may reduce the chances of the intermediate film 30 losing its transparency or producing air bubbles therein. Note that the intermediate film 30 may be dried either before or after the intermediate film 30 is loaded into the chamber 8, whichever is appropriate.

When formed by the vacuum chamber process, the multi-layer stack 100 is heated in the chamber 8 at a reduced pressure, e.g., at a degree of vacuum equal to or less than 0.7 atm ($\simeq$0.07 MPa) and preferably at a degree of vacuum equal to or less than 0.5 atm (0.05 MPa).

Optionally, the intermediate film 30 may also be made of, for example, a UV curable resin. In that case, the multi-layer stack 100 may be formed with little flexure by irradiating, with an ultraviolet ray, the intermediate film 30 made of a UV curable resin and interposed between the glass panel unit 10 and the transparent plate 20 with the multi-layer assembly 41 loaded in the evacuated chamber 8.

Optionally, after the glass panel unit 10 and the transparent plate 20 have been assembled together, the assembly may be subjected to autoclave curing at a low temperature.

1-2-2. Use of Multi-Layer Stack

The multi-layer stack 100 may be used in any field without limitation but is applicable to, for example, a field that requires high mechanical strength and excellent thermal insulation properties. Examples of uses of the multi-layer stack 100 include various types of moving vehicles such as automobiles, railway trains, watercrafts, spacecrafts, and space stations. For example, when applied to an automobile, the multi-layer stack 100 may be used in its front windshield, side windows, and rear windshield, for example.

2. Second Embodiment

Next, a method for manufacturing a multi-layer stack 100 according to a second embodiment will be described with reference to FIGS. 13 and 14. In the following description, description of a common feature between the first embodiment described above and the second embodiment to be described below will be omitted herein.

In the method for manufacturing a multi-layer stack 100 according to this embodiment, first, a multi-layer assembly 41 in which the glass panel unit 10 and the transparent plate 20 are assembled together via the intermediate film 30 is provided. Next, the multi-layer assembly 41 is heated inside an evacuated chamber 8 to soften the intermediate film 30. Then, with the multi-layer assembly 41 left loaded inside the chamber 8, the inside of the chamber 8 will be kept evacuated until the intermediate film 30 is cooled and cured.

The method for manufacturing the multi-layer stack 100 according to this embodiment is carried out by, for example, loading the multi-layer assembly 41 into the chamber 8 after the multi-layer assembly 41 has been brought into contact with rubber heaters of approximately the same size as the transparent plate 20 on both of the upper and lower surfaces thereof, starting heating the multi-layer assembly 41 with the rubber heaters turned ON, and evacuating the chamber 8. At this time, if the pressure inside the chamber 8 is 0.5 atm (0.05 MPa), for example, then the degree of flexure around the spacers 4 may be approximately halved. In addition, the intermediate film 30 also softens to follow the surface shapes of the first glass panel 1 and the second glass panel 2, which would halve the degree of the multi-layer stack 100 as well. Thereafter, with the pressure inside the chamber 8 maintained, the rubber heaters are turned OFF to cool the intermediate film 30. This may reduce the flexure of the multi-layer stack 100. After that, the pressure inside the chamber 8 is restored to the atmospheric pressure and the multi-layer stack 100 is unloaded.

A method for manufacturing the multi-layer stack 100 according to this embodiment includes the following first, second, and third process steps. The first process step includes providing a multi-layer assembly 41 including the glass panel unit 10, the intermediate film 30, and the transparent plate 20 attached to the glass panel unit 10 via the intermediate film 30 as shown in FIG. 13. In this multi-layer assembly 41, the glass panel unit 10 and the transparent plate 20 have been assembled together by a process other than the vacuum chamber process according to the first embodiment. For example, the multi-layer assembly 41 may be formed by a vacuum bag process using a bag.

According to the vacuum bag process, first, the glass panel unit 10, the intermediate film 30, and the transparent plate 20 are put into a bag. Next, the bag is evacuated, thus causing the bag to shrink. The bag thus shrunk presses the glass panel unit 10, the intermediate film 30, and the transparent plate 20 and assembles the glass panel unit 10 and the transparent plate 20 together via the intermediate film 30, thereby forming the multi-layer assembly 41. Optionally, the multi-layer assembly 41 provided in this first process step may be formed without using the bag. Alternatively, the multi-layer assembly 41 provided in the first process step may also be the multi-layer assembly 41 (multi-layer stack 100) that has gone through the assembling process using the vacuum chamber according to the first embodiment.

The second process step is performed after the first process step. The second process step includes heating, inside the evacuated chamber 8, the multi-layer assembly 41 that has been provided in the first step to cause the intermediate film 30 to be softened. For example, if the intermediate film 30 is made of a PVB resin, then the intermediate film 30 will be softened by being heated at a temperature equal to or higher than 140° C. for approximately 30 minutes. In the second process step, the inside of the chamber 8 is evacuated, thereby reducing the flexure of the first glass panel 1 and the second glass panel 2 of the multi-layer assembly 41 as shown in FIG. 14.

The third process step is performed after the second process step. The third process step includes stopping heating the multi-layer assembly 41 with the multi-layer assembly 41 still loaded in the chamber 8, thereby cooling the multi-layer assembly 41. In this process step, the inside of the chamber 8 will be kept evacuated until the intermediate film 30 that has been softened in the second process step is cured. This allows the intermediate film 30 of the multi-layer assembly 41 to be cured with the flexure of the first glass panel 1 and the second glass panel 2 reduced. Consequently, the multi-layer assembly 41 turns into a multi-layer stack 100 with reduced flexure.

Figure 13:
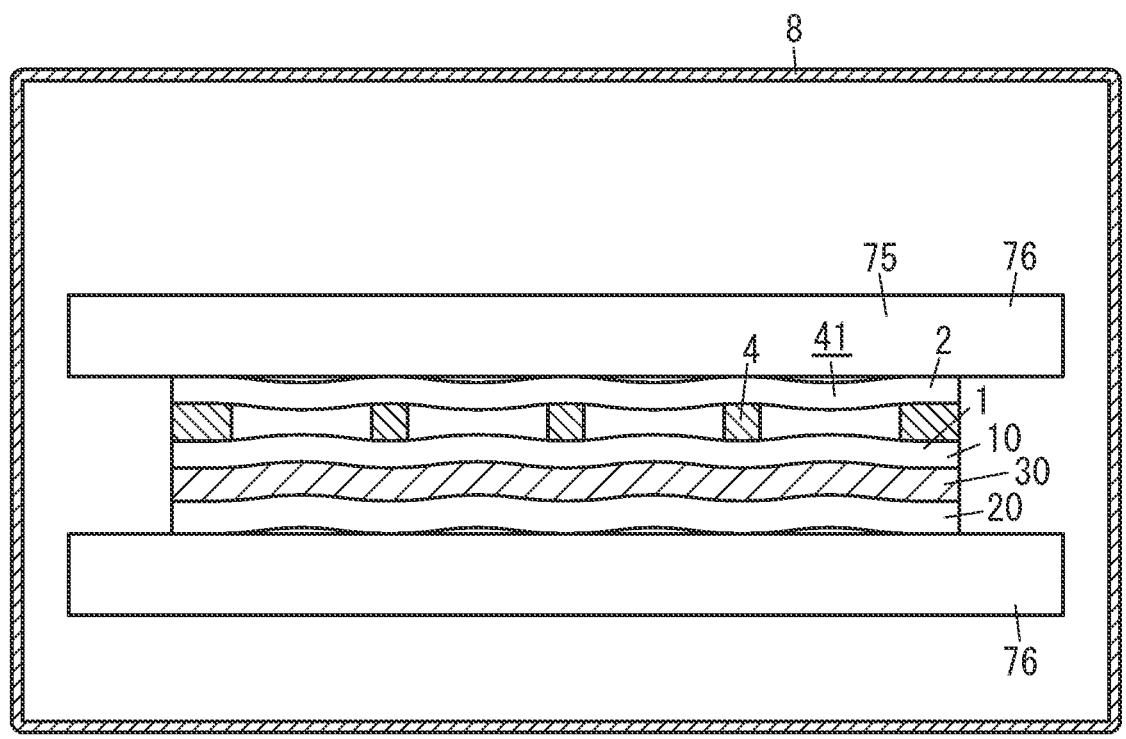
FIG. 13 is a schematic cross-sectional view illustrating a method for manufacturing a multi-layer stack according to a second embodiment and showing a state where a multi-layer assembly is loaded inside a chamber.
Figure 14:
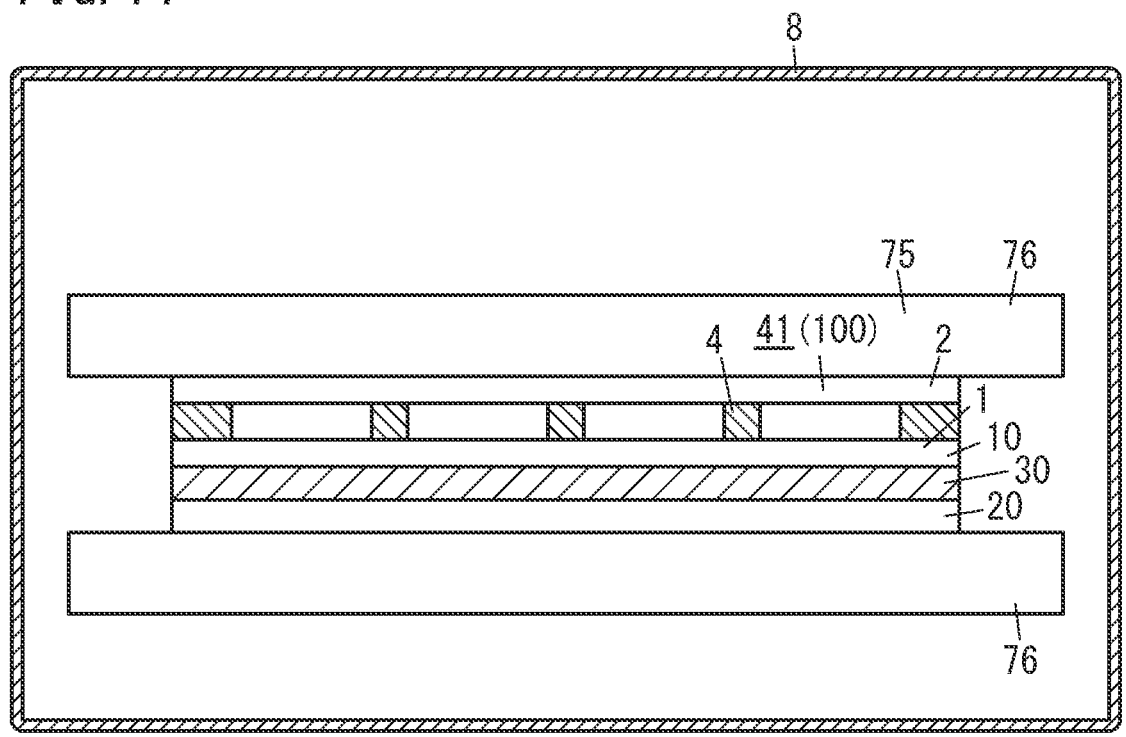
FIG. 14 is a schematic cross-sectional view showing a state where the multi-layer assembly is heated.

The method for manufacturing the multi-layer stack 100 according to this embodiment may be performed using, for example, the chamber 8 shown in FIG. 13 and the heater device 75 installed in the chamber 8. The heater device 75 includes a pair of heaters 76, which are arranged to be spaced from each other in the upward/downward direction. Each of these heaters 76 may be a rubber heater, for example.

The heater device 75 may be used, for example, in the following manner. First, as shown in FIG. 13, the pair of heaters 76 are arranged inside the chamber 8 and the multi-layer assembly 41 is placed between the pair of heaters 76. At this time, one heater 76 out of the pair of heaters 76 is brought into contact with one outer surface along the thickness of the multi-layer assembly 41 (i.e., the outer surface of the transparent plate 20) and the other heater 76 is brought into contact with the other outer surface along the thickness of the multi-layer assembly 41 (i.e., either the outer surface 12 of the second glass panel 2 or the outer surface 11 of the first glass panel 1).

Next, the inside of the chamber 8 is evacuated and the multi-layer assembly 41 will be kept heated in this state by the pair of heaters 76 until the intermediate film 30 is cured. This may reduce the flexure of the glass panel unit 10 due to the atmospheric pressure as shown in FIG. 14. In addition, this may also reduce the flexure of the transparent plate 20 along the surface of the glass panel unit 10 accordingly.

After the flexure of the multi-layer assembly 41 has been reduced in this manner, the pair of heaters 76 stops heating the multi-layer assembly 41 to cool the multi-layer assembly 41. The multi-layer assembly 41 will be cooled with the inside of the chamber 8 kept evacuated until the intermediate film 30 is cured. Curing the intermediate film 30 in this manner allows the glass panel unit 10 and the transparent plate 20 to be assembled together via the intermediate film 30 with their flexure reduced, thereby forming a multi-layer stack 100 with reduced flexure.

3. Third Embodiment 3-1. Overview of Third Embodiment

Figure 15:
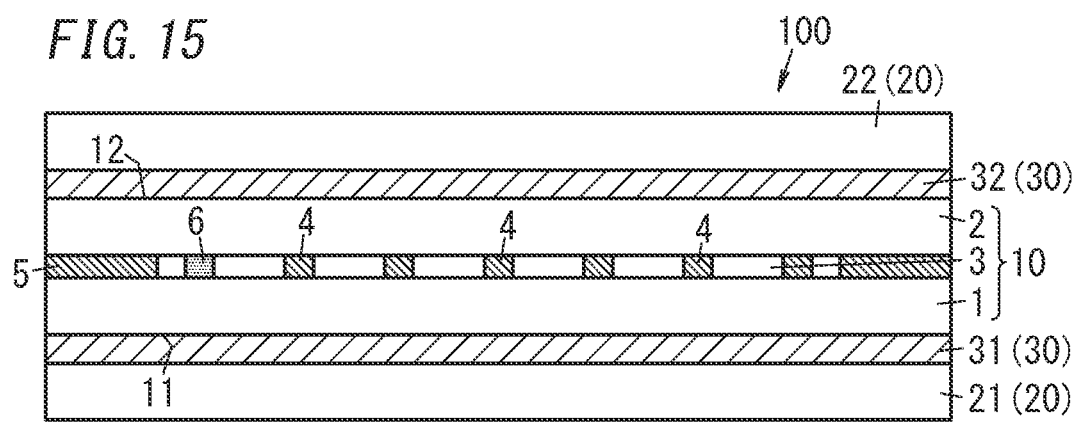
FIG. 15 is a schematic cross-sectional view illustrating an exemplary multi-layer stack according to a third embodiment.

Next, a method for manufacturing a multi-layer stack 100 according to a third embodiment will be described. In this embodiment, the multi-layer stack 100 shown in FIG. 15 is manufactured. The multi-layer stack 100 includes the glass panel unit 10, a first transparent plate 21, a first intermediate film 31, a second transparent plate 22, and a second intermediate film 32. In this embodiment, the multi-layer stack 100 is manufactured by the same vacuum chamber process as in the first embodiment. In the following description, description of a common feature between the first and third embodiments will be omitted herein.

The first transparent plate 21 is provided for the outer surface 11 of the first glass panel 1 of the glass panel unit 10. The first intermediate film 31 is interposed between the first glass panel 1 and the first transparent plate 21. That is to say, the first transparent plate 21 is provided along the outer surface 11 of the first glass panel 1 and the first intermediate film 31 is interposed between the first glass panel 1 and the first transparent plate 21.

The second transparent plate 22 is provided for the outer surface 12 of the second glass panel 2 of the glass panel unit 10. The second intermediate film 32 is interposed between the second glass panel 2 and the second transparent plate 22. That is to say, the second transparent plate 22 is provided along the outer surface 12 of the second glass panel 2 and the second intermediate film 32 is interposed between the second glass panel 2 and the second transparent plate 22.

In the multi-layer stack 100 according to this embodiment, the first transparent plate 21 and the second transparent plate 22 are respectively provided for the outer surface 11 of the first glass panel 1 and the outer surface 12 of the second glass panel 2. This allows the multi-layer stack 100 to have improved mechanical strength, thermal insulation properties, and sound insulation compared to the glass panel unit 10 without any of these transparent plates 21, 22. In addition, this also makes the mechanical strength, thermal insulation properties, and sound insulation of this multi-layer stack 100 superior to those of the multi-layer stack 100 in which the transparent plate 20 is provided for only either the outer surface 11 of the first glass panel 1 or the outer surface 12 of the second glass panel 2.

Figure 16:
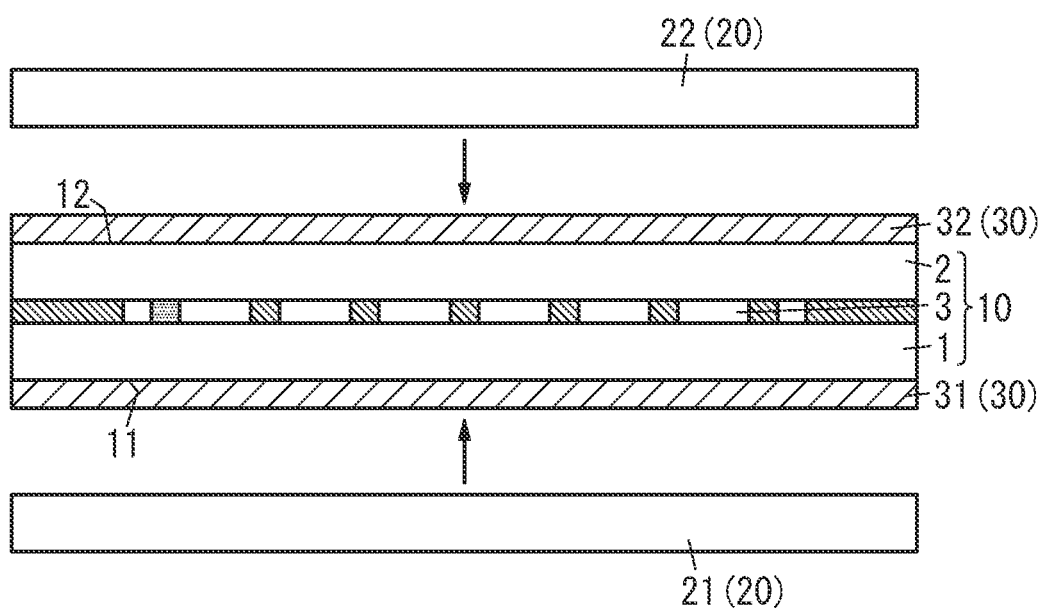
FIG. 16 is a schematic cross-sectional view illustrating an exemplary method for manufacturing the multi-layer stack.

To manufacture the multi-layer stack 100 according to this embodiment, the outer surface 11 of the first glass panel 1 of the glass panel unit 10 and the first transparent plate 21 are assembled together via the first intermediate film 31 as shown in FIG. 16. In addition, the outer surface 12 of the second glass panel 2 of the glass panel unit 10 and the second transparent plate 22 are also assembled together via the second intermediate film 32. In this manner, a multi-layer stack 100 with excellent mechanical strength, thermal insulation properties, and sound insulation may be obtained.

3-2. Details of Third Embodiment

Next, the multi-layer stack 100 according to the third embodiment and a method for manufacturing the same will be described in detail.
3-2-1. Multi-Layer Stack In the multi-layer stack 100 according to this embodiment, the transparent plate 20 includes the first transparent plate 21 and the second transparent plate 22 described above, and the intermediate film 30 includes the first intermediate film 31 and the second intermediate film 32 described above. These constituent elements will be described in detail. In the following description, any constituent element of the multi-layer stack 100 according to this third embodiment, having the same function as a counterpart of the multi-layer stack 100 according to the first embodiment described above, will be designated by the same reference numeral as that counterpart's, and description thereof will be sometimes omitted herein.
(1) Glass Panel Unit The glass panel unit 10 according to this embodiment has the same configuration as the glass panel unit 10 according to the first embodiment. Thus, the glass panel unit 10 includes: the first glass panel 1; the second glass panel 2; and the evacuated space 3 interposed between the first glass panel 1 and the second glass panel 2. In addition, in the evacuated space 3, the plurality of spacers 4 made of resin are provided between the first glass panel 1 and the second glass panel 2.
(2) Transparent Plate The transparent plate 20 according to this embodiment includes the first transparent plate 21 and the second transparent plate 22 as described above.
(i) First Transparent Plate The first transparent plate 21 is a plate member having light-transmitting properties. The material for the first transparent plate 21 may be the same as the material for the transparent plate 20 according to the first embodiment.

In the multi-layer stack 100 according to this embodiment, the first transparent plate 21 is provided for the outer surface 11 of the first glass panel 1 of the glass panel unit 10. Thus, the first transparent plate 21 faces the glass panel unit 10. In addition, the first transparent plate 21 also faces the first glass panel 1.
(ii) Second Transparent Plate The second transparent plate 22 is a plate member having light-transmitting properties. The material for the second transparent plate 22 may also be the same as the material for the transparent plate 20 according to the first embodiment. In this embodiment, the material for the first transparent plate 21 and the material for the second transparent plate 22 may be either the same as each other or different from each other, whichever is appropriate.

For example, the first transparent plate 21 and the second transparent plate 22 may be both made of polycarbonate. Alternatively, the first transparent plate 21 and the second transparent plate 22 may be both made of glass, for example. Still alternatively, one of the first transparent plate 21 or the second transparent plate 22 may be made of polycarbonate and the other may be made of glass.

That is to say, at least one of the first transparent plate 21 or the second transparent plate 22 suitably includes a glass pane. In addition, at least one of the first transparent plate 21 or the second transparent plate 22 suitably includes a polycarbonate plate.

In the multi-layer stack 100 according to this embodiment, the second transparent plate 22 is provided for the outer surface 12 of the second glass panel 2 of the glass panel unit 10. Thus, the second transparent plate 22 faces the glass panel unit 10. In addition, the second transparent plate 22 also faces the second glass panel 2.
(3) Intermediate Film The intermediate film 30 according to this embodiment includes the first intermediate film 31 and the second intermediate film 32 as described above.
(i) First Intermediate Film The first intermediate film 31 may have the same configuration as the intermediate film 30 according to the first embodiment. In the multi-layer stack 100 according to this embodiment, the first intermediate film 31 is interposed between the outer surface 11 of the first glass panel 1 of the glass panel unit 10 and the first transparent plate 21. Thus, the first intermediate film 31 may be used to bond the glass panel unit 10 and the first transparent plate 21 together, and more specifically, bond the first glass panel 1 and the first transparent plate 21 together.
(ii) Second Intermediate Film The second intermediate film 32 may have the same configuration as the intermediate film 30 according to the first embodiment. In the multi-layer stack 100 according to this embodiment, the second intermediate film 32 is interposed between the outer surface 12 of the second glass panel 2 of the glass panel unit 10 and the second transparent plate 22. Thus, the second intermediate film 32 may be used to bond the glass panel unit 10 and the second transparent plate 22 together, and more specifically, bond the second glass panel 2 and the second transparent plate 22 together.
(iii) Materials for First Intermediate Film and Second Intermediate Film The first intermediate film 31 may have the same configuration as the intermediate film 30 according to the first embodiment as described above. Thus, the material for the first intermediate film 31 may be the same as the material for the intermediate film 30 according to the first embodiment.

Likewise, the second intermediate film 32 may have the same configuration as the intermediate film 30 according to the first embodiment. Thus, the material for the second intermediate film 32 may also be the same as the material for the intermediate film 30 according to the first embodiment.

In the multi-layer stack 100 according to this embodiment, the first intermediate film 31 and the second intermediate film 32 are suitably made of different materials. This makes it easier to enhance the performance of the multi-layer stack 100 while facilitating the manufacturing process thereof at the same time.

For example, at least one of the first intermediate film 31 or the second intermediate film 32 is suitably made of a PVB resin. This would ensure sufficient mechanical strength for the multi-layer stack 100, to say the least. In addition, this would also increase the anti-penetration ability of the multi-layer stack 100.

In addition, at least one of the first intermediate film 31 or the second intermediate film 32 is suitably made of an EVA resin. This would increase the anti-scattering ability of the multi-layer stack 100. In addition, using the EVA resin allows the glass panel unit 10 and the transparent plate 21, 22 to be bonded together at a relatively low temperature, thus facilitating the manufacturing process of the multi-layer stack 100 as well. This would also increase the handleability of the multi-layer stack 100.

Furthermore, making the first intermediate film 31 and the second intermediate film 32 of two different materials would allow the multi-layer stack 100 to achieve both the advantages of the material for the first intermediate film 31 and the advantages of the material for the second intermediate film 32 alike.

For example, it is recommended that the first intermediate film 31 be made of the PVB resin and the second intermediate film 32 be made of the EVA resin. Alternatively, it is also recommended that the first intermediate film 31 be made of the EVA resin and the second intermediate film 32 be made of the PVB resin. In each of these cases, the manufacturing process of the multi-layer stack 100 may be facilitated with sufficient mechanical strength ensured for the multi-layer stack 100. That is to say, the mechanical strength enhancement and simplified manufacturing process are achieved at the same time for the multi-layer stack 100. In addition, the multi-layer stack 100 with each of these configurations may also have anti-penetration ability and anti-scattering ability at a time. For example, one of the first intermediate film 31 or the second intermediate film 32 which is required to have sufficient anti-penetration ability is suitably made of the PVB resin and the other intermediate film 31, 32 required to have anti-scattering ability is suitably made of the EVA resin.

Alternatively, in this embodiment, the first intermediate film 31 and the second intermediate film 32 may also be made of the same material. In that case, the advantages of the material for the first intermediate film 31 and the second intermediate film 32 would be achieved particularly significantly.

For example, the first intermediate film 31 and the second intermediate film 32 are suitably both made of the PVB resin. This would increase the mechanical strength of the multi-layer stack 100 particularly significantly. In addition, this would also increase the anti-penetration ability of the multi-layer stack 100 particularly significantly. Alternatively, the first intermediate film 31 and the second intermediate film 32 are also suitably both made of the EVA resin. This would facilitate the manufacturing process of the multi-layer stack 100 particularly significantly. In addition, this would also increase the anti-scattering ability of the multi-layer stack 100 particularly significantly.

3-2-2. Method for Manufacturing Multi-Layer Stack

The multi-layer stack 100 according to this embodiment may be manufactured by performing, for example, the following process steps. Note that the following method for manufacturing the multi-layer stack 100 is only an example and should not be construed as limiting.

First, the glass panel unit 10, the transparent plates 20, and the intermediate films 30 are provided as shown in FIG. 16. In the multi-layer stack 100 according to this embodiment, the transparent plates 20 include the first transparent plate 21 and the second transparent plate 22, and the intermediate films 30 include the first intermediate film 31 and the second intermediate film 32. Thus, the first transparent plate 21 and the second transparent plate 22 are provided as the transparent plates 20, and the first intermediate film 31 and the second intermediate film 32 are provided as the intermediate films 30.

Next, the glass panel unit 10 and the transparent plates 20 are assembled together via the intermediate films 30. In this embodiment, the outer surface 11 of the first glass panel 1 of the glass panel unit 10 and the first transparent plate 21 are assembled together via the first intermediate film 31. In addition, the outer surface 12 of the second glass panel 2 of the glass panel unit 10 and the second transparent plate 22 are assembled together via the second intermediate film 32. In each of the process step of assembling the glass panel unit 10 and the first transparent plate 21 together and the process step of assembling the glass panel unit 10 and the second transparent plate 22 together, the pressure applied for assembling is less than the compressive strength of the plurality of resin spacers 4 included in the glass panel unit 10. This reduces the chances of the plurality of resin spacers 4 included in the glass panel unit 10 collapsing under the pressure.

Assembling the glass panel unit 10 and the first transparent plate 21 and assembling the glass panel unit 10 and the second transparent plate 22 may be performed either two different processes or simultaneously, whichever is appropriate.

For example, if the first intermediate film 31 and the second intermediate film 32 are made of the same material, then assembling the glass panel unit 10 and the first transparent plate 21 and assembling the glass panel unit 10 and the second transparent plate 22 are suitably performed simultaneously. This enables manufacturing the multi-layer stack 100 efficiently.

For example, the first intermediate film 31 and the second intermediate film 32 are suitably both made of a PVB resin. In that case, the glass panel unit 10, the first transparent plate 21, and the second transparent plate 22 are suitably assembled together at a relative humidity of 10% or less. This allows bonding the glass panel unit 10 and the first transparent plate 21 together only by heating and bonding the glass panel unit 10 and the second transparent plate 22 together only by heating. This may also reduce the chances of the first intermediate film 31 and the second intermediate film 32 made of the PVB resin losing transparency or producing bubbles therein. Alternatively, both the first intermediate film 31 and the second intermediate film 32 are suitably made of, for example, an EVA resin. Still alternatively, the first intermediate film 31 and the second intermediate film 32 may be both made of a thermosetting resin or both made of a UV curable resin.

Particularly when the first intermediate film 31 and the second intermediate film 32 are both made of the PVB resin, the glass panel unit 10 and the transparent plates 20 are laid one on top of another with the intermediate films 30 as sheets of resin interposed between themselves, and the glass panel unit 10, the transparent plates 20, and the intermediate films 30 are loaded into a chamber. Then, a negative pressure is produced inside the chamber by a vacuum pump connected to the chamber to dry the intermediate films 30. This allows decreasing the moisture content of the intermediate films 30. Specifically, the intermediate films 30 are suitably dried to a moisture content equal to or less than 0.5% by weight. The glass panel unit 10 and the transparent plates 21, 22 may be bonded together only by heating via the first intermediate film 31 and the second intermediate film 32 by decreasing the moisture content of the first intermediate film 31 and the second intermediate film 32 as described above. This reduces the chances of the intermediate films 30 losing its transparency and/or producing air bubbles therein while reducing the deformation of the spacers 4 included in the glass panel unit 10 and the damage and deformation of the first glass panel 1 and the second glass panel 2.

According to this embodiment, assembling the glass panel unit 10 and the first transparent plate 20 and assembling the glass panel unit 10 and the first transparent plate 20 are performed by the method using the vacuum chamber as in the method for manufacturing the multi-layer stack 100 according to the first embodiment. Specifically, the glass panel unit 10, the intermediate films 30, and the transparent plates 20 are loaded into the chamber 8 and the glass panel unit 10 and the transparent plates 20 are assembled together via the intermediate films 30 with the inside of the chamber 8 evacuated.

Naturally, even when the first intermediate film 31 and the second intermediate film 32 are both made of an EVA resin, the glass panel unit 10, the first transparent plate 21, and the second transparent plate 22 may also be bonded together by the method using the vacuum chamber.

For example, if the first intermediate film 31 and the second intermediate film 32 are made of different materials, then assembling the glass panel unit 10 and the first transparent plate 21 by the method using the vacuum chamber and assembling the glass panel unit 10 and the second transparent plate 22 by the method using the vacuum chamber are preferably performed as two different processes. If the first intermediate film 31 and the second intermediate film 32 are made of different materials, then the heating temperature required for the bonding process using the first intermediate film 31 and the heating temperature required for the bonding process using the second intermediate film 32 may be different from each other. Thus, simultaneously heating the first intermediate film 31 and the second intermediate film 32 that are made of different materials would make the bond strength insufficient and/or deform the intermediate films 30 in some cases. In contrast, performing assembling the glass panel unit 10 and the first transparent plate 21 and assembling the glass panel unit 10 and the second transparent plate 22 as two different processes may reduce the chances of making the bond strength insufficient and/or causing deformation and other inconveniences to the intermediate films 30.

Specifically, one of the first and second intermediate films 31, 32 that requires the higher heating temperature for bonding than the other intermediate film 31, 32 is preferably bonded earlier than the other intermediate film 31, 32. For example, if the first intermediate film 31 requires the higher heating temperature than the second intermediate film 32, then it is recommended that the glass panel unit 10 and the first transparent plate 21 be assembled together via the first intermediate film 31 first and then the glass panel unit 10 and the second transparent plate 22 be assembled together via the second intermediate film 32. On the other hand, if the second intermediate film 32 requires the higher heating temperature than the first intermediate film 31, then it is recommended that the glass panel unit 10 and the second transparent plate 22 be assembled together via the second intermediate film 32 first and then the glass panel unit 10 and the first transparent plate 21 be assembled together via the first intermediate film 31.

For example, if the first intermediate film 31 is made of a PVB resin and the second intermediate film 32 is made of an EVA resin, then the heating temperature required for the bonding process using the first intermediate film 31 made of the PVB resin may be higher than the heating temperature required for the bonding process using the second intermediate film 32 made of the EVA resin. In that case, it is recommended that the glass panel unit 10 and the first transparent plate 21 be assembled together via the first intermediate film 31 made of the PVB resin first and then the glass panel unit 10 and the second transparent plate 22 be assembled together via the second intermediate film 32 made of the EVA resin.

Figure 17:
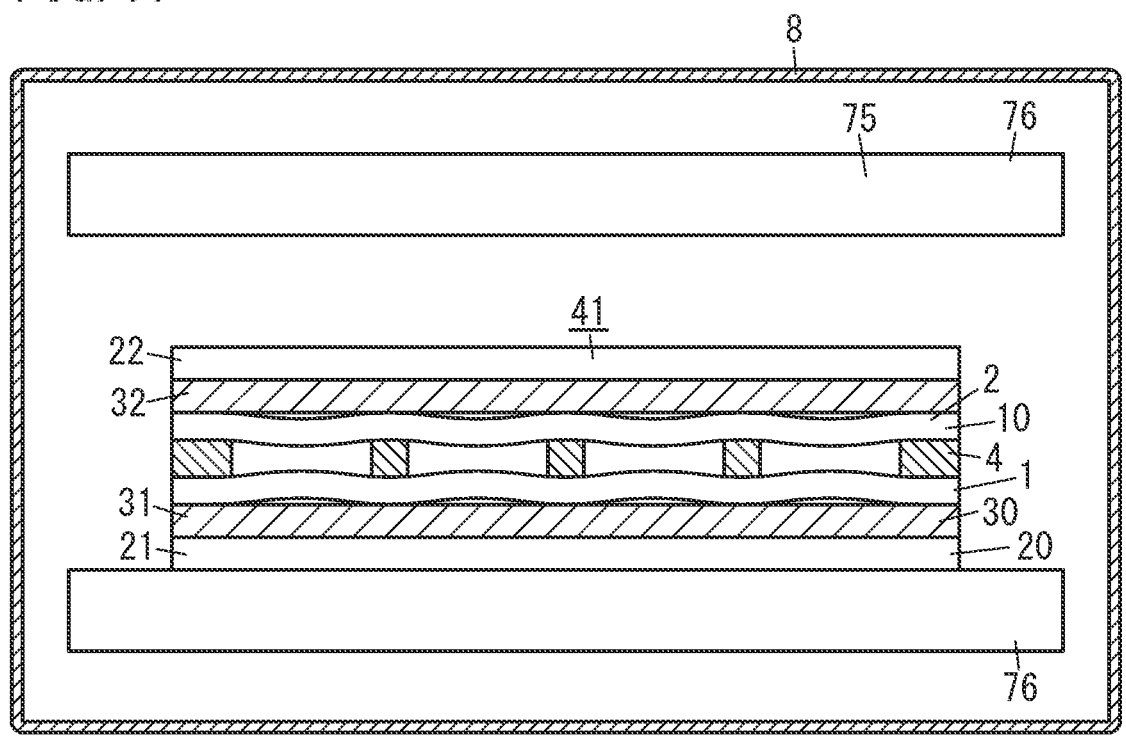
FIG. 17 is a schematic cross-sectional view illustrating a method for manufacturing the multi-layer stack and showing a state where a multi-layer assembly is loaded inside a chamber.

The vacuum chamber process according to this embodiment may be performed by using, for example, the chamber 8 shown in FIG. 17 and the heater device 75 installed in the chamber 8. The heater device 75 includes a pair of heaters 76, which are arranged to be spaced from each other in the upward/downward direction.

In the vacuum chamber process according to this embodiment, first, a multi-layer assembly 41 including the glass panel unit 10, the intermediate films 30, and the transparent plates 20 is loaded into the vacuum chamber 8 as shown in FIG. 17. At this time, the multi-layer assembly 41 is in a state where the first transparent plate 21, the first intermediate film 31, the glass panel unit 10, the second intermediate film 32, and the second transparent plate 22 have been stacked one on top of another in this order.

Figure 18:
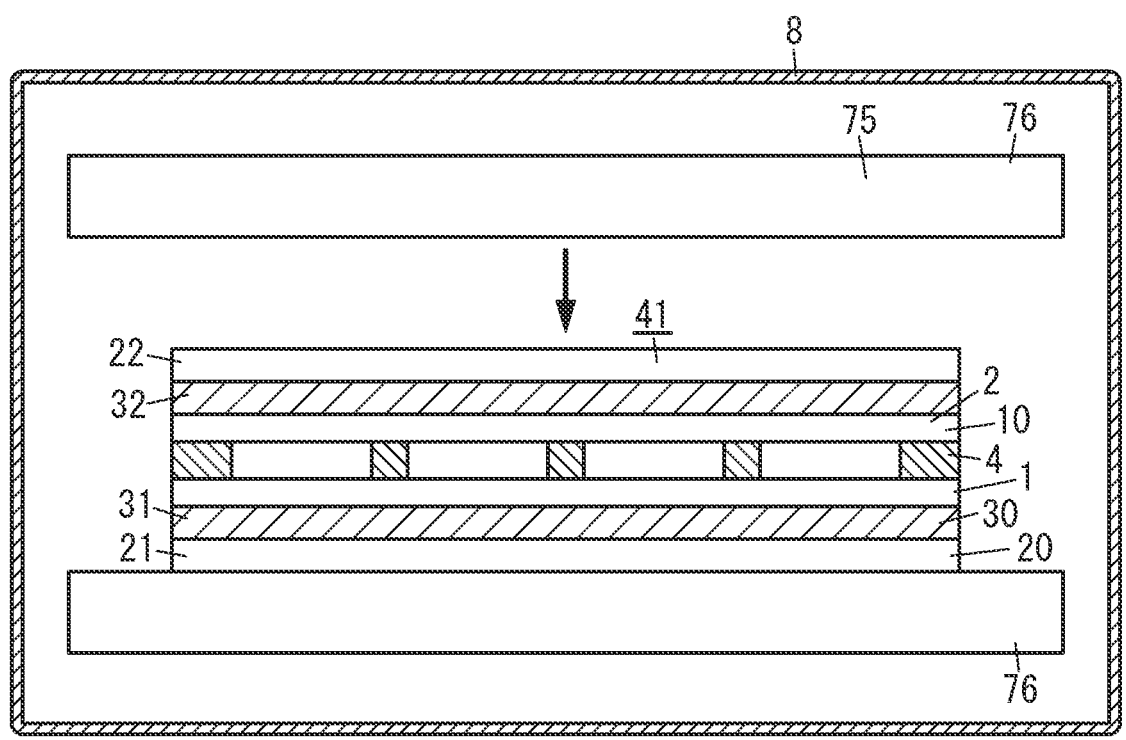
FIG. 18 is a schematic cross-sectional view showing a state where the chamber shown in FIG. 17 is evacuated.
Figure 19:
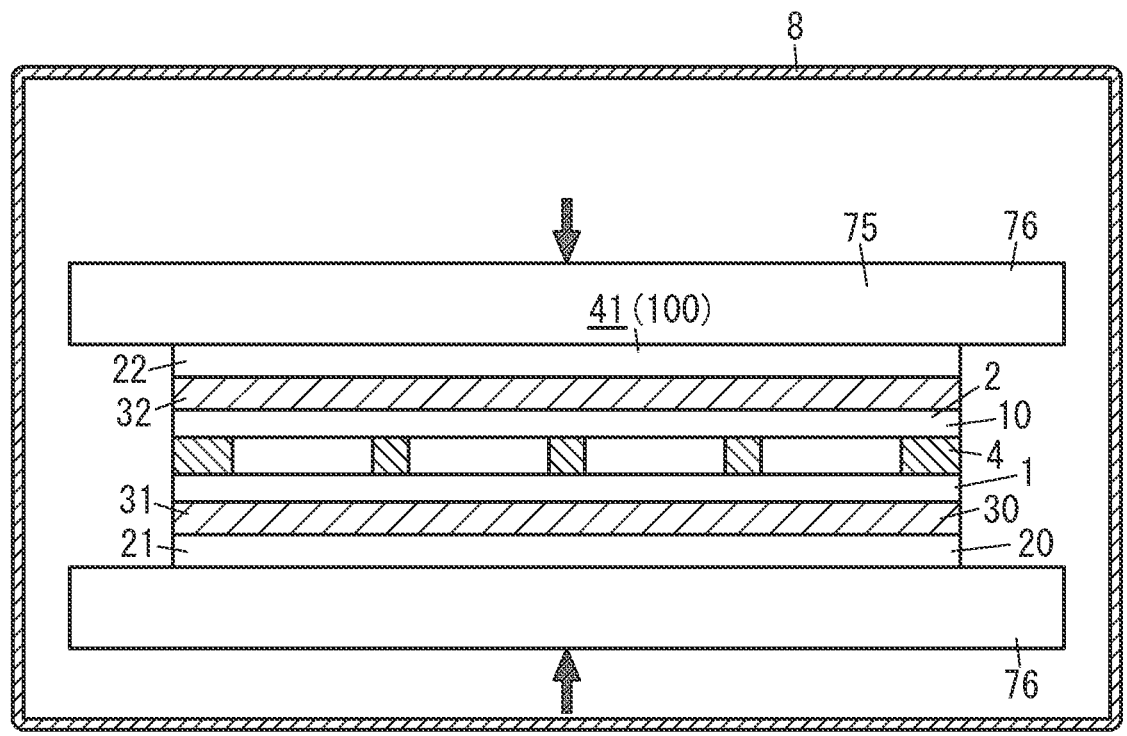
FIG. 19 is a schematic cross-sectional view showing a state where the multi-layer assembly shown in FIG. 18 is heated.

Next, the vacuum chamber 8 is evacuated using a rotary pump, for example, thereby reducing the flexure of the first glass panel 1 and the second glass panel 2 as shown in FIG. 18. Subsequently, as shown in FIG. 19, the multi-layer assembly 41 is sandwiched between, and heated by, the pair of heaters 76 provided over and under the multi-layer assembly 41, thus causing the intermediate films 30 to be melted and softened. In addition, the multi-layer assembly 41 is also compressed, thus exhausting air bubbles out of the intermediate films 30. In this case, the multi-layer assembly 41 is pressed by the pair of heaters 76 with force less than the compressive strength of the spacers 4 (e.g., force of 1 atm ($\approx 0.1$ MPa)).

Thereafter, with the multi-layer assembly 41 kept compressed by the pair of heaters 76, the heaters 76 are powered OFF to stop heating the multi-layer assembly 41 and cool the multi-layer assembly 41. This causes the temperature of the multi-layer assembly 41 to fall and also causes the intermediate films 30 to be cured, thus forming a multi-layer stack 100 in which the glass panel unit 10, the intermediate films 30, and the transparent plates 20 are bonded together.

Next, the pressure inside the vacuum chamber 8 is restored to the atmospheric pressure and the multi-layer stack 100 is unloaded from the vacuum chamber 8. Note that the inside of the chamber 8 will be kept evacuated at least until the intermediate films 30 are cured since the first glass panel 1 and the second glass panel 2 have had their flexure reduced.

Optionally, if assembling the glass panel unit 10 and the first transparent plate 21 and assembling the glass panel unit 10 and the second transparent plate 22 are performed as two different processes, then the assembling apparatus 7 shown in FIG. 6 may be used. That is to say, the glass panel unit 10 and the first transparent plate 21 may be assembled together by using the assembling apparatus 7 as in the first embodiment and the glass panel unit 10 and the second transparent plate 22 may be assembled together by using the assembling apparatus 7 as in the first embodiment.

4. Fourth Embodiment

Next, a method for manufacturing a multi-layer stack 100 according to a fourth embodiment will be described with reference to FIGS. 20 and 21. In this embodiment, a multi-layer stack 100 having the same configuration as the multi-layer stack 100 according to the third embodiment is manufactured. That is to say, the multi-layer stack 100 shown in FIG. 15 is manufactured.

In this embodiment, the multi-layer stack 100 is manufactured by the same manufacturing method as the one adopted in the second embodiment. Specifically, the multi-layer assembly 41 in which the glass panel unit 10 and the transparent plates 20 are assembled together via the intermediate films 30 is heated inside an evacuated chamber 8 to soften the intermediate films 30. Then, with the multi-layer assembly 41 still loaded inside the chamber 8, the inside of the chamber 8 will be kept evacuated until the intermediate films 30 are cooled and cured. Note that in the following description of the fourth embodiment, description of a common feature between the fourth embodiment and the second and third embodiments described above will be omitted herein.

Specifically, in the method for manufacturing a multi-layer stack 100 according to this embodiment, first, a first process step is performed. The first process step includes providing a multi-layer assembly 41. The multi-layer assembly 41 includes the glass panel unit 10, the first intermediate film 31, the first transparent plate 21 attached to the glass panel unit 10 via the first intermediate film 31, the second intermediate film 32, and the second transparent plate 22 attached to the glass panel unit 10 via the second intermediate film 32. In this multi-layer assembly 41, the glass panel unit 10 and the first and second transparent plates 21, 22 have been assembled together by a process other than the vacuum chamber process.

A second process step is performed after the first process step. The second process step includes heating, inside the evacuated chamber 8, the multi-layer assembly 41 that has been provided in the first step to cause the first intermediate film 31 and the second intermediate film 32 to be softened. In the second process step, the inside of the chamber 8 is evacuated, thereby reducing the flexure of the first glass panel 1 and the second glass panel 2 of the multi-layer assembly 41.

A third process step is performed after the second process step. The third process step includes stopping heating the multi-layer assembly 41 with the multi-layer assembly 41 still loaded inside the chamber 8, thereby cooling the multi-layer assembly 41. In this process step, the inside of the chamber 8 will be kept evacuated until the first intermediate film 31 and the second intermediate film 32 that have been softened in the second process step are cured. This allows the first intermediate film 31 and the second intermediate film 32 to be cured with the flexure of the first glass panel 1 and the second glass panel 2 reduced. Consequently, the multi-layer assembly 41 turns into a multi-layer stack 100 with reduced flexure.

Figure 20:
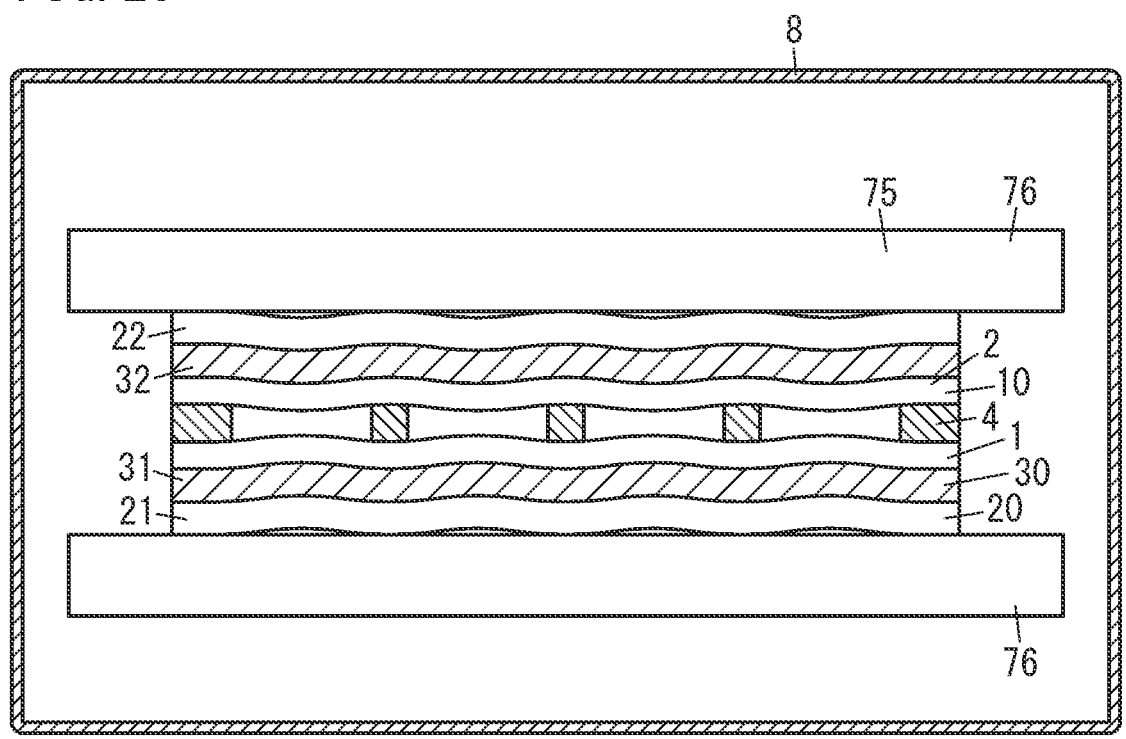
FIG. 20 is a schematic cross-sectional view illustrating a method for manufacturing a multi-layer stack according to a fourth embodiment and showing a state where a multi-layer assembly is loaded inside a chamber.
Figure 21:
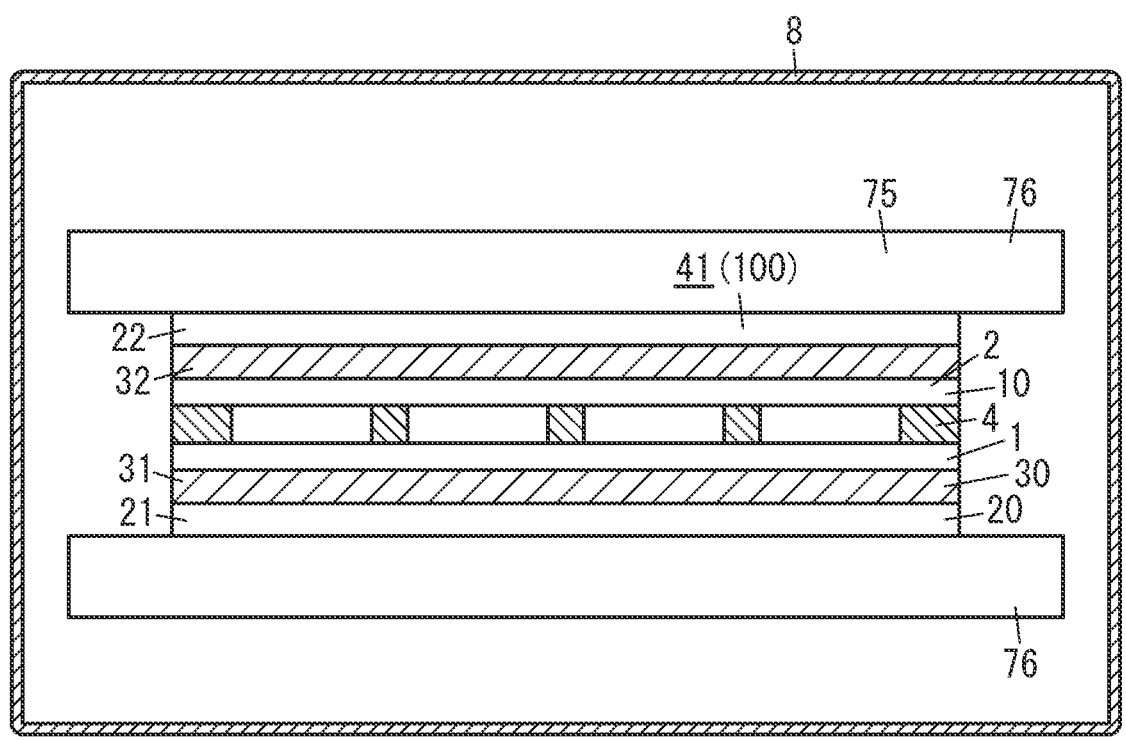
FIG. 21 is a schematic cross-sectional view showing a state where the multi-layer assembly is heated.

The method for manufacturing the multi-layer stack 100 according to this embodiment may be performed by using, for example, the chamber 8 shown in FIG. 20 and the heater device 75 installed in the chamber 8. The heater device 75 includes a pair of heaters 76, which are arranged to be spaced from each other in the upward/downward direction. Each of these heaters 76 may be a rubber heater, for example.

The heater device 75 may be used, for example, in the following manner. First, as shown in FIG. 20, the pair of heaters 76 are arranged inside the chamber 8 and the multi-layer assembly 41 is placed between the pair of heaters 76. At this time, one heater 76 out of the pair of heaters 76 is brought into contact with one outer surface along the thickness of the multi-layer assembly 41 (i.e., the outer surface of the first transparent plate 21) and the other heater 76 is brought into contact with the other outer surface along the thickness of the multi-layer assembly 41 (i.e., the outer surface of the second transparent plate 22).

Next, the inside of the chamber 8 is evacuated and the multi-layer assembly 41 will be kept heated in this state by the pair of heaters 76 until the first intermediate film 31 and the second intermediate film 32 are cured. This may reduce the flexure of the glass panel unit 10 due to the atmospheric pressure as shown in FIG. 21. In addition, this may also reduce the flexure of the first transparent plate 21 and the second transparent plate 22 along the surface of the glass panel unit 10 accordingly.

After the flexure of the multi-layer assembly 41 has been reduced in this manner, the pair of heaters 76 stops heating the multi-layer assembly 41 to cool the multi-layer assembly 41. The multi-layer assembly 41 will be cooled with the inside of the chamber 8 kept evacuated until the intermediate films 30 are cured. Curing the intermediate films 30 in this manner allows a multi-layer stack 100 to be formed with reduced flexure.

5. Recapitulation

As is clear from the foregoing description of the first and third embodiments, a method for manufacturing a multi-layer stack (100) according to a first aspect has the following feature. The multi-layer stack (100) includes a glass panel unit (10), an intermediate film (30), and a transparent plate (20) attached via the intermediate film (30) to the glass panel unit (10). The glass panel unit (10) includes a first glass panel (1), a second glass panel (2), and an evacuated space (3) interposed between the first glass panel (1) and the second glass panel (2). The method includes assembling the glass panel unit (10) and the transparent plate (20) together via the intermediate film (30) inside an evacuated chamber (8).

This aspect enables manufacturing a multi-layer stack (100) in which the transparent plate (20) is attached to the glass panel unit (10), and which has excellent thermal insulation properties and mechanical strength. In addition, while the glass panel unit (10) and the transparent plate (20) are being assembled together, the glass panel unit (10) is placed in an evacuated environment inside a chamber (8). This allows the glass panel unit (10) and the transparent plate (20) to be assembled together with flexure (warpage) of the glass panel unit (10) due to the atmospheric pressure reduced. This enables manufacturing a multi-layer stack (100) with reduced flexure.

A method for manufacturing a multi-layer stack (100) according to a second aspect may be implemented in conjunction with the first aspect. In the second aspect, the method includes assembling, inside the evacuated chamber (8), the glass panel unit (10) and the transparent plate (20) together via the intermediate film (30) that has been softened by heating; and then keeping the inside of the chamber (8) evacuated until the intermediate film (30) is cured while leaving the glass panel unit (10), the intermediate film (30), and the transparent plate (20) loaded inside the chamber (8).

This aspect may reduce the flexure of the glass panel unit (10) until the intermediate film (30) is cured since the glass panel unit (10) and the transparent plate (20) have been assembled together. This enables manufacturing a multi-layer stack (100) with further reduced flexure.

A method for manufacturing a multi-layer stack (100) according to a third aspect may be implemented in conjunction with the first or second aspect. In the third aspect, the transparent plate (20) has greater rigidity than at least one glass panel, to which the transparent plate (20) is attached via the intermediate film (30), out of two glass panels that are the first glass panel (1) and the second glass panel (2).

This aspect reduces the chances of the glass panel unit (10) being flexed after the glass panel unit (10) and the transparent plate (20) have been assembled together. This enables manufacturing a multi-layer stack (100) with further reduced flexure.

A method for manufacturing a multi-layer stack (100) according to a fourth aspect may be implemented in conjunction with any one of the first to third aspects. At least one glass panel, to which the transparent plate (20) is attached via the intermediate film (30), out of two glass panels that are the first glass panel (1) and the second glass panel (2) has a thickness equal to or less than 3 mm.

This aspect enables manufacturing a multi-layer stack (100), of which a glass panel has a thickness equal to or less than 3 mm and which has reduced flexure.

As is clear from the foregoing description of the second and fourth embodiments, a method for manufacturing a multi-layer stack (100) according to a fifth aspect has the following feature. The multi-layer stack (100) includes a glass panel unit (10), an intermediate film (30), and a transparent plate (20) attached via the intermediate film (30) to the glass panel unit (10). The glass panel unit (10) includes a first glass panel (1), a second glass panel (2), and an evacuated space (3) interposed between the first glass panel (1) and the second glass panel (2). The method includes: heating a multi-layer assembly (41), including the glass panel unit (10), the intermediate film (30), and the transparent plate (20) attached via the intermediate film (30) to the glass panel unit (10), inside an evacuated chamber (8) to soften the intermediate film (30); and then keeping the inside of the chamber (8) evacuated until the intermediate film (30) is cooled and cured while leaving the multi-layer assembly (41) loaded inside the chamber (8).

This aspect enables manufacturing a multi-layer stack (100) in which a transparent plate (20) is attached onto a glass panel unit (10), and which has excellent thermal insulation properties and mechanical strength. In addition, the multi-layer assembly (41) may have its flexure due to the atmospheric pressure reduced by having the chamber (8) evacuated and the intermediate film (30) is cured in such a state. This enables manufacturing a multi-layer stack (100) with reduced flexure.

A method for manufacturing a multi-layer stack (100) according to a sixth aspect may be implemented in conjunction with any one of the first to fifth aspects. In the sixth aspect, the glass panel unit (10) has a plurality of spacers (4). The plurality of spacers (4) are provided, in the evacuated space (3), between the first glass panel (1) and the second glass panel (2). A pressure applied when the glass panel unit (10) and the transparent plate (20) are assembled together is less than a compressive strength of the plurality of spacers (4).

This aspect may reduce the chances of the spacers (4) of the glass panel unit (10) collapsing under pressure while the glass panel unit (10) and the transparent plate (20) are being assembled together.

In a method for manufacturing a multi-layer stack (100) according to a seventh aspect, which may be implemented in conjunction with the sixth aspect, the pressure applied while the glass panel unit (10) and the transparent plate (20) are being assembled together is equal to or less than 3 atm ($\approx$0.3 MPa).

This aspect may significantly reduce the chances of the spacers (4) of the glass panel unit (10) collapsing under the pressure.

In a method for manufacturing a multi-layer stack (100) according to an eighth aspect, which may be implemented in conjunction with any one of the first to seventh aspects, the intermediate film (30) contains at least one of a PVB resin or an EVA resin.

This aspect increases, if the intermediate film (30) is made of a PVB resin, the mechanical strength and anti-penetration ability of the multi-layer stack (100). On the other hand, if the intermediate film (30) is made of an EVA resin, this aspect increases the handleability and anti-scattering ability of the multi-layer stack (100).

In a method for manufacturing a multi-layer stack (100) according to a ninth aspect, which may be implemented in conjunction with the eighth aspect, the intermediate film (30) includes the PVB resin, and the intermediate film (30) is dried to a moisture content of 0.5% by weight or less before the glass panel unit (10) and the transparent plate (20) are assembled together.

This aspect allows the glass panel unit (10) and the transparent plate (20) to be bonded together via the intermediate film (30) just by heating, thus reducing the chances of causing deformation and other inconveniences to the spacers (4) of the glass panel unit (10). In addition, this aspect also reduces the chances of the intermediate film (30) losing its transparency or producing air bubbles therein.

In a method for manufacturing a multi-layer stack (100) according to a tenth aspect, which may be implemented in conjunction with any one of the first to ninth aspects, the transparent plate (20) includes a first transparent plate (21) and a second transparent plate (22). The intermediate film (30) includes a first intermediate film (31) and a second intermediate film (32). The method includes assembling an outer surface (11) of the first glass panel (1) of the glass panel unit (10) and the first transparent plate (21) via the first intermediate film (31). In addition, the method also includes assembling an outer surface (12) of the second glass panel (2) and the second transparent plate (22) via the second intermediate film (32).

This aspect provides a multi-layer stack (100) with particularly excellent mechanical strength and thermal insulation properties.

In a method for manufacturing a multi-layer stack (100) according to an eleventh aspect, which may be implemented in conjunction with the tenth aspect, the first intermediate film (31) and the second intermediate film (32) are made of mutually different materials.

This aspect makes it easier to improve the performance of the multi-layer stack (100) while facilitating the manufacture process of the multi-layer stack (100) at the same time.

In a method for manufacturing a multi-layer stack (100) according to a twelfth aspect, which may be implemented in conjunction with the tenth or eleventh aspect, at least one of the first intermediate film (31) or the second intermediate film (32) is made of an EVA resin.

This aspect may improve the handleability and anti-scattering ability of the multi-layer stack (100).

In a method for manufacturing a multi-layer stack (100) according to a thirteenth aspect, which may be implemented in conjunction with any one of the tenth to twelfth aspects, at least one of the first transparent plate (21) or the second transparent plate (22) includes a glass pane.

This aspect may provide a multi-layer stack (100) with excellent mechanical strength and thermal insulation properties.

In a method for manufacturing a multi-layer stack (100) according to a fourteenth aspect, which may be implemented in conjunction with any one of the tenth to thirteenth aspects, at least one of the first transparent plate (21) or the second transparent plate (22) includes a polycarbonate plate.

This aspect may provide a multi-layer stack (100) with excellent mechanical strength and thermal insulation properties.

Note that the features according to the second to fourteenth aspects are not essential features for the method for manufacturing a multi-layer stack (100) but may be omitted as appropriate.

REFERENCE SIGNS LIST

1 First Glass Panel
2 Second Glass Panel
3 Evacuated Space
10 Glass Panel Unit
11 Outer Surface
12 Outer Surface
20 Transparent Plate
30 Intermediate Film
100 Multi-Layer Stack

The invention claimed is:

1. A method for manufacturing a multi-layer stack, the multi-layer stack including:
    a glass panel unit;
    an intermediate film; and
    a transparent plate attached via the intermediate film to the glass panel unit,
the glass panel unit including:
    a first glass panel;
    a second glass panel; and
an evacuated space interposed between the first glass panel and the second glass panel,
the method comprising:
    loading, into a chamber, a multi-layer assembly where the glass panel unit is stacked over the transparent plate with the intermediate film interposed between the transparent plate and the glass panel unit; then
    evacuating the chamber; and then
    making the multi-layer assembly be sandwiched between and heated by a pair of heaters of a heater device installed inside the chamber to assemble the glass panel unit and the transparent plate together via the intermediate film inside the evacuated chamber.

2. The method of claim 1, comprising:
assembling, inside the evacuated chamber, the glass panel unit and the transparent plate together via the intermediate film that has been softened by heating; and then
keeping inside of the chamber evacuated until the intermediate film is cured while leaving the glass panel unit, the intermediate film, and the transparent plate loaded inside the chamber.

3. The method of claim 1, wherein
the transparent plate has greater rigidity than at least one glass panel, to which the transparent plate is attached via the intermediate film, out of two glass panels that are the first glass panel and the second glass panel.

4. The method of claim 1, wherein
at least one glass panel, to which the transparent plate is attached via the intermediate film, out of two glass panels that are the first glass panel and the second glass panel has a thickness equal to or less than 3 mm.

5. A method for manufacturing a multi-layer stack, the multi-layer stack including:
    a glass panel unit;
    an intermediate film; and
    a transparent plate attached via the intermediate film to the glass panel unit,
the glass panel unit including:
    a first glass panel;
    a second glass panel; and
    an evacuated space interposed between the first glass panel and the second glass panel,
the method comprising:
    loading, into a chamber, a multi-layer assembly, including the glass panel unit, the intermediate film, and the transparent plate attached via the intermediate film to the glass panel unit, then
    evacuating the chamber and heating the multi-layer assembly by a heater installed inside the chamber, thereby heating the multi-layer assembly inside the evacuated chamber to soften the intermediate film; and then
keeping inside of the chamber evacuated until the intermediate film is cooled and cured while leaving the multi-layer assembly loaded inside the chamber.

6. The method of claim 2, wherein
the transparent plate has greater rigidity than at least one glass panel, to which the transparent plate is attached via the intermediate film, out of two glass panels that are the first glass panel and the second glass panel.

7. The method of claim 2, wherein
at least one glass panel, to which the transparent plate is attached via the intermediate film, out of two glass panels that are the first glass panel and the second glass panel has a thickness equal to or less than 3 mm.

8. The method of claim 3, wherein
at least one glass panel, to which the transparent plate is attached via the intermediate film, out of two glass panels that are the first glass panel and the second glass panel has a thickness equal to or less than 3 mm.

* * * * *